United States Patent
Chalmers et al.

(10) Patent No.: US 10,405,407 B2
(45) Date of Patent: *Sep. 3, 2019

(54) SYSTEMS AND METHODS FOR PROVIDING HIGH-MAST LIGHTING

(71) Applicant: Phoenix Products, LLC, Milwaukee, WI (US)

(72) Inventors: Alexander Chalmers, New York, CA (US); Bradley D. Lurie, Cumming, GA (US); John Parker Chalmers, San Francisco, CA (US); Christopher Alvarez, Ceres, CA (US); Ramiro Barajas, Albuquerque, NM (US); Ryan Chase Kelly, Centennial, CO (US); Dan Woodall, Turlock, CA (US)

(73) Assignee: PHOENIX PRODUCTS, LLC, Milwaukee, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/827,065

(22) Filed: Nov. 30, 2017

(65) Prior Publication Data
US 2018/0206314 A1      Jul. 19, 2018

Related U.S. Application Data

(63) Continuation of application No. 15/145,475, filed on May 3, 2016, now Pat. No. 9,860,964, which is a
(Continued)

(51) Int. Cl.
*F21S 8/08* (2006.01)
*F21V 7/00* (2006.01)
(Continued)

(52) U.S. Cl.
CPC .......... *H05B 37/0272* (2013.01); *F21S 8/086* (2013.01); *F21V 7/00* (2013.01);
(Continued)

(58) Field of Classification Search
CPC ... H02J 7/35; H05B 33/0803; H05B 33/0815; H05B 33/083; H05B 33/0845;
(Continued)

(56) References Cited

U.S. PATENT DOCUMENTS 3,660,650 A    5/1972  Harold, Jr.
3,686,498 A    8/1972  Roy
(Continued)

FOREIGN PATENT DOCUMENTS

KR          100693178 B1      3/2007
KR        20110006239 A       1/2011
(Continued)

OTHER PUBLICATIONS

Notice of allowance dated Jul. 10, 2017 for U.S. Appl. No. 14/323,967.
(Continued)

*Primary Examiner* — Alexander H Taningco
*Assistant Examiner* — Renan Luque
(74) *Attorney, Agent, or Firm* — Wilson Sonsini Goodrich & Rosati

(57) ABSTRACT

Systems and methods of providing illumination may be provided in accordance with the invention. A lighting unit may be provided comprising a plurality of light sources, each light source of said plurality being at least partially surrounded by an optical element, and a support configured to support the light source above a surface. The light sources may be light emitting plasma sources, and the support may be a high-mast support. In some embodiments, the optical element may be a reflector containing one or more facets, directing the light toward the surface. In some configurations, each light source of said plurality may be independently controllable and/or dimmable. A lighting unit may communicate with an external controller, which may provide instructions for controlling the light sources. A lighting (Continued)

system may be provided with a host controlling a plurality of lighting units, which may be organized into zones. The zones, lighting units, and/or light sources may be independently controllable.

19 Claims, 19 Drawing Sheets

Related U.S. Application Data continuation of application No. 13/734,891, filed on Jan. 4, 2013, now Pat. No. 9,363,861.

(60) Provisional application No. 61/583,496, filed on Jan. 5, 2012.

(51) Int. Cl.
| | | |
|---|---|---|
| F21V 21/00 | (2006.01) | |
| F21V 29/76 | (2015.01) | |
| F21V 29/77 | (2015.01) | |
| H05B 37/02 | (2006.01) | |
| F21W 131/10 | (2006.01) | |

(52) U.S. Cl.
CPC ............. *F21V 21/00* (2013.01); *F21V 29/76* (2015.01); *F21V 29/77* (2015.01); *H05B 37/02* (2013.01); *H05B 37/0227* (2013.01); *H05B 37/0281* (2013.01); *F21W 2131/10* (2013.01); *Y02B 20/72* (2013.01)

(58) Field of Classification Search
CPC ............... H05B 33/0893; H05B 37/02; H05B 37/0218; H05B 37/0227; H05B 37/0245; H05B 37/0272; H05B 37/029; H05B 37/034

See application file for complete search history.

(56) References Cited

U.S. PATENT DOCUMENTS

| | | | |
|---|---|---|---|
| 4,002,944 | A | 1/1977 | McNeill et al. |
| 4,994,718 | A | 2/1991 | Gordin |
| 5,313,378 | A | 5/1994 | Gordin et al. |
| 5,816,691 | A | 10/1998 | Gordin et al. |
| 6,036,338 | A | 3/2000 | Gordin |
| 6,203,176 | B1 | 3/2001 | Gordin |
| 6,464,196 | B1 | 10/2002 | Crookham et al. |
| 6,676,279 | B1 | 1/2004 | Hubbell et al. |
| 6,681,110 | B1 | 1/2004 | Crookham et al. |
| 6,692,142 | B1 | 2/2004 | Gordin et al. |
| 6,948,826 | B2 | 9/2005 | Fogerlie |
| 7,059,745 | B2 | 6/2006 | Gordin et al. |
| 7,067,992 | B2 | 6/2006 | Leong et al. |
| 7,209,958 | B2 | 4/2007 | Crookham et al. |
| 7,246,918 | B2 | 7/2007 | Ginsburg |
| 7,284,879 | B2 | 10/2007 | Gordin et al. |
| 7,350,936 | B2 | 4/2008 | Ducharme et al. |
| 7,731,383 | B2 | 6/2010 | Myer |
| 7,740,381 | B2 | 6/2010 | Gordin et al. |
| 7,778,635 | B2 | 8/2010 | Crookham et al. |
| 7,862,213 | B2 | 1/2011 | Gordin et al. |
| 7,940,007 | B2 | 5/2011 | Chang et al. |
| 8,007,137 | B2 | 8/2011 | Gordin et al. |
| 8,029,154 | B2 | 10/2011 | Myer |
| 8,123,383 | B2 | 2/2012 | Gordin et al. |
| 8,162,511 | B1 | 4/2012 | Gordin et al. |
| 8,163,993 | B2 | 4/2012 | Gordin et al. |
| 8,206,011 | B2 | 6/2012 | Gordin et al. |
| 8,217,763 | B2 | 7/2012 | Elferich et al. |
| 8,247,990 | B1 | 8/2012 | Gordin et al. |
| 8,282,435 | B2 | 10/2012 | Espiau |
| 8,439,534 | B1 | 5/2013 | Roe et al. |
| 8,545,067 | B2 | 10/2013 | Espiau |
| 8,651,693 | B2 | 2/2014 | Josefowicz et al. |
| 8,690,391 | B2 | 4/2014 | Drake et al. |
| 9,363,861 | B2 | 6/2016 | Chalmers et al. |
| 9,801,261 | B2 | 10/2017 | Lurie et al. |
| 9,860,964 | B2 | 1/2018 | Chalmers et al. |
| 2003/0151918 | A1 | 8/2003 | Gordin et al. |
| 2004/0056775 | A1 | 3/2004 | Crookham et al. |
| 2005/0057158 | A1 | 3/2005 | Chang et al. |
| 2005/0231955 | A1 | 10/2005 | Gordin et al. |
| 2006/0158887 | A1 | 7/2006 | Holder et al. |
| 2006/0176695 | A1 | 8/2006 | Gordin et al. |
| 2006/0176708 | A1 | 8/2006 | Gordin et al. |
| 2006/0181875 | A1 | 8/2006 | Gordin et al. |
| 2006/0198145 | A1 | 9/2006 | Gordin |
| 2006/0203500 | A1 | 9/2006 | Lee et al. |
| 2006/0274532 | A1 | 12/2006 | Gordin et al. |
| 2008/0143493 | A1 | 6/2008 | Nam et al. |
| 2008/0265799 | A1* | 10/2008 | Sibert ................ H05B 37/0245 315/292 |
| 2008/0273335 | A1 | 11/2008 | Gordin et al. |
| 2009/0129081 | A1 | 5/2009 | Gordin |
| 2009/0279952 | A1 | 11/2009 | Hoppe |
| 2010/0029268 | A1* | 2/2010 | Myer ....................... F21S 2/00 455/426.1 |
| 2010/0073504 | A1 | 3/2010 | Park et al. |
| 2010/0103668 | A1 | 4/2010 | Lueken et al. |
| 2010/0214784 | A1 | 8/2010 | Stauffer |
| 2010/0264853 | A1 | 10/2010 | Amutham |
| 2010/0283390 | A1 | 11/2010 | Brandt et al. |
| 2010/0301768 | A1* | 12/2010 | Chemel ................ H05B 37/029 315/294 |
| 2010/0315252 | A1 | 12/2010 | Desphande et al. |
| 2011/0121734 | A1 | 5/2011 | Pape |
| 2011/0133655 | A1 | 6/2011 | Recker et al. |
| 2011/0149582 | A1 | 6/2011 | McKee |
| 2011/0193484 | A1* | 8/2011 | Harbers ............. H05B 33/0803 315/129 |
| 2011/0205746 | A1 | 8/2011 | Lundin et al. |
| 2011/0215735 | A1 | 9/2011 | Herbst et al. |
| 2011/0285287 | A1 | 11/2011 | Neate |
| 2012/0014118 | A1 | 1/2012 | Espiau et al. |
| 2012/0098445 | A1 | 4/2012 | Park et al. |
| 2012/0154239 | A1 | 6/2012 | Bar-Sade et al. |
| 2012/0201016 | A1 | 8/2012 | Robertson et al. |
| 2012/0217897 | A1 | 8/2012 | Gordin et al. |
| 2012/0229033 | A1* | 9/2012 | Vaclavik ............. H05B 37/0227 315/153 |
| 2013/0013091 | A1* | 1/2013 | Cavalcanti ......... H05B 37/0272 700/90 |
| 2013/0015783 | A1* | 1/2013 | Herbst ............... H05B 37/0245 315/297 |
| 2013/0193856 | A1 | 8/2013 | Chalmers et al. |
| 2014/0117852 | A1* | 5/2014 | Zhai ................... H05B 37/0245 315/86 |
| 2015/0008829 | A1 | 1/2015 | Lurie et al. |
| 2017/0118826 | A1 | 4/2017 | Chalmers et al. |

FOREIGN PATENT DOCUMENTS

| | | | | |
|---|---|---|---|---|
| WO | WO-2012172470 | A1 * | 12/2012 | ......... H05B 37/0245 |
| WO | WO-2013103904 | A1 | 7/2013 | |
| WO | WO-2015003174 | A1 | 1/2015 | |

OTHER PUBLICATIONS

Notice of allowance dated Sep. 1, 2017 for U.S. Appl. No. 15/145,475.
Office action dated Feb. 27, 2017 for U.S. Appl. No. 14/323,967.
802.15.4d—2009 IEEE Standard for Information technology—Telecommunications and information exchange between system—Local and metropolitan area networks—Specific requirements Part 15.4: Wireless Medium Access Control (MAC) and Physical Layer (PHY) Specifications for Low-Rate Wireless Personal Area Networks (WPANs) Amendment 3: Alternative Physical Layer Extension to support the Japanese 950 MHz bands. Apr. 17, 2009; c1-27. http://ieeexplore.ieee.org/xpl/freeabs_all.jsp?arnumber=4840354.
European search report and search opinion dated Jul. 20, 2015 for EP Application No. 13733777.0.

(56) References Cited

OTHER PUBLICATIONS

GovEnergy Slides—Introduction to Light Emitting Plasma. Dallas Convention Center. Dallas, Texas. Aug. 15-18, 2010.
Hubbell Industrial Lightning. Complete product and reference guide. 2007. http://www.hubbellindustrial.com/content/products/literature/literature_files/hicatalog_full.pdf.
International search report and written opinion dated Apr. 23, 2013 for PCT/US2013/020402.
International search report and written opinion dated Oct. 20, 2014 for PCT Application No. US2014/045493.
Jennic. IEEE802.15.4 Wireless Networks User Guide. JN-UG-3024. Revision 1.1. Oct. 6, 2006.
Jennic. JenNet Stack User Guide. JN-UG-3041. Revision 2.0. Sep. 28, 2010.
Jennic. JN51xx Integrated Peripherals API User Guider. JN-UG-3066. Revision 2.1. Jun. 30, 2011.
Notice of allowance dated Feb. 23, 2016 for U.S. Appl. No. 13/734,891.
Office action dated Jan. 16, 2015 for U.S. Appl. No. 13/734,891.
Office action dated Feb. 18, 2016 for U.S. Appl. No. 14/323,967.
Office action dated Jul. 16, 2015 for U.S. Appl. No. 14/323,967.
Office action dated Sep. 28, 2016 for U.S. Appl. No. 14/323,967.
Office action dated Nov. 6, 2015 for U.S. Appl. No. 13/734,891.
Philips Radiant Generation 2 Brochure. 2011. http://www.lightingproducts.philips.com/Documents/webdb2/Gardco/pdf/g_radiant_broc.pdf.
Saemisch. AGi32 Knowledgebase. Info: Definitions of IES Roadway Luminaire Classifications (Types I, II, III, IV, V and VS) . Created Aug. 15, 2006, modified Jan. 5, 2011. http://www.agi32.com/kb/index.php?article=77.
Sytepro area lighting brochure. 2013. http://www.stonco.com/sytepro/PDF/sytepro4color.pdf.
VLED. Series Brochure. 2013. http://www.usaltg.com/Series-VLED.html.

* cited by examiner

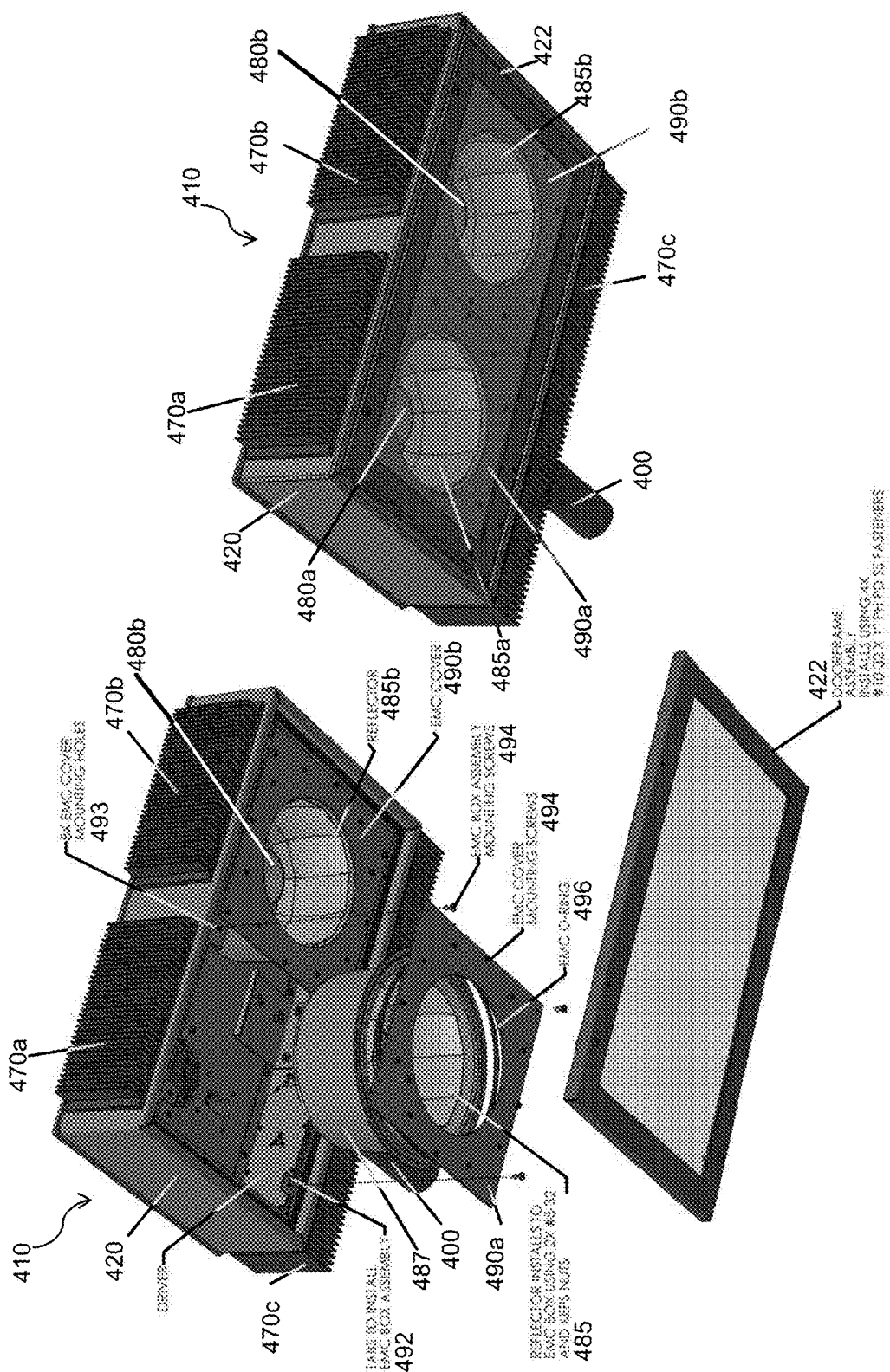

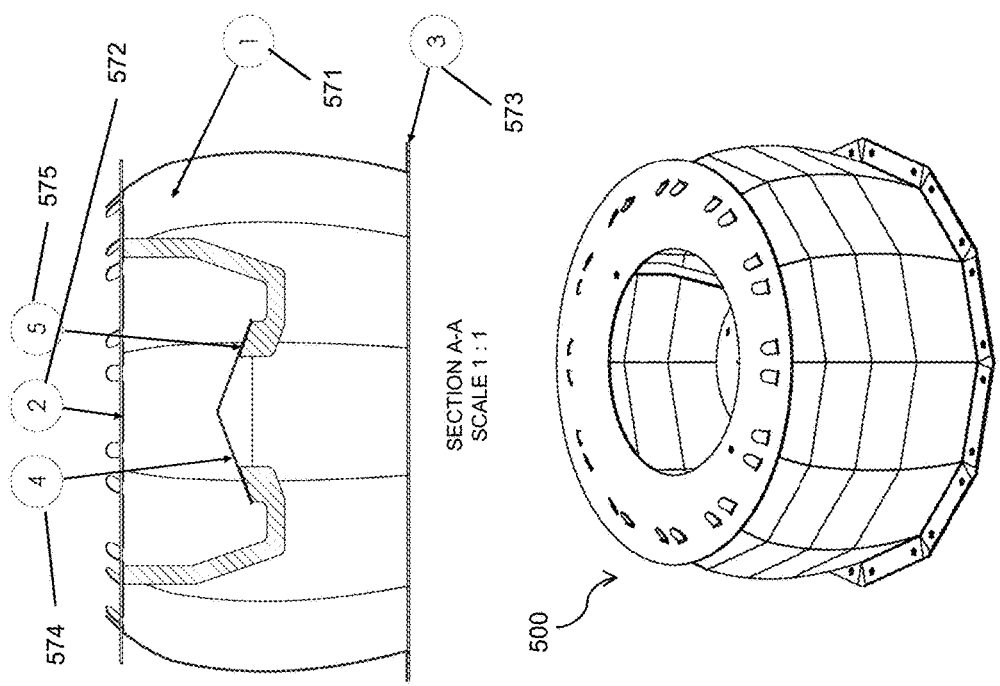
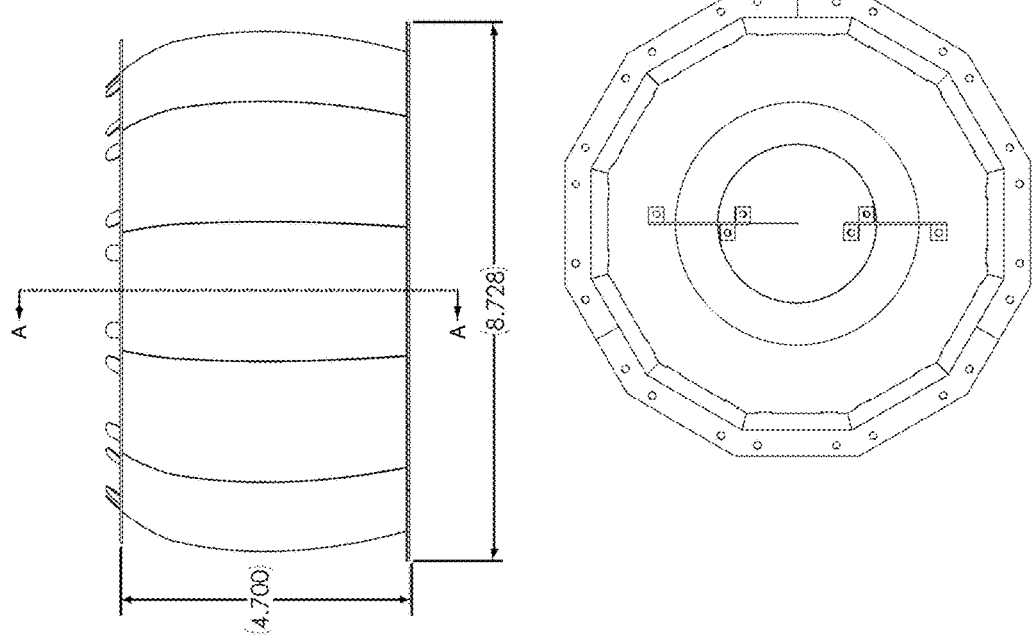
FIG. 5D

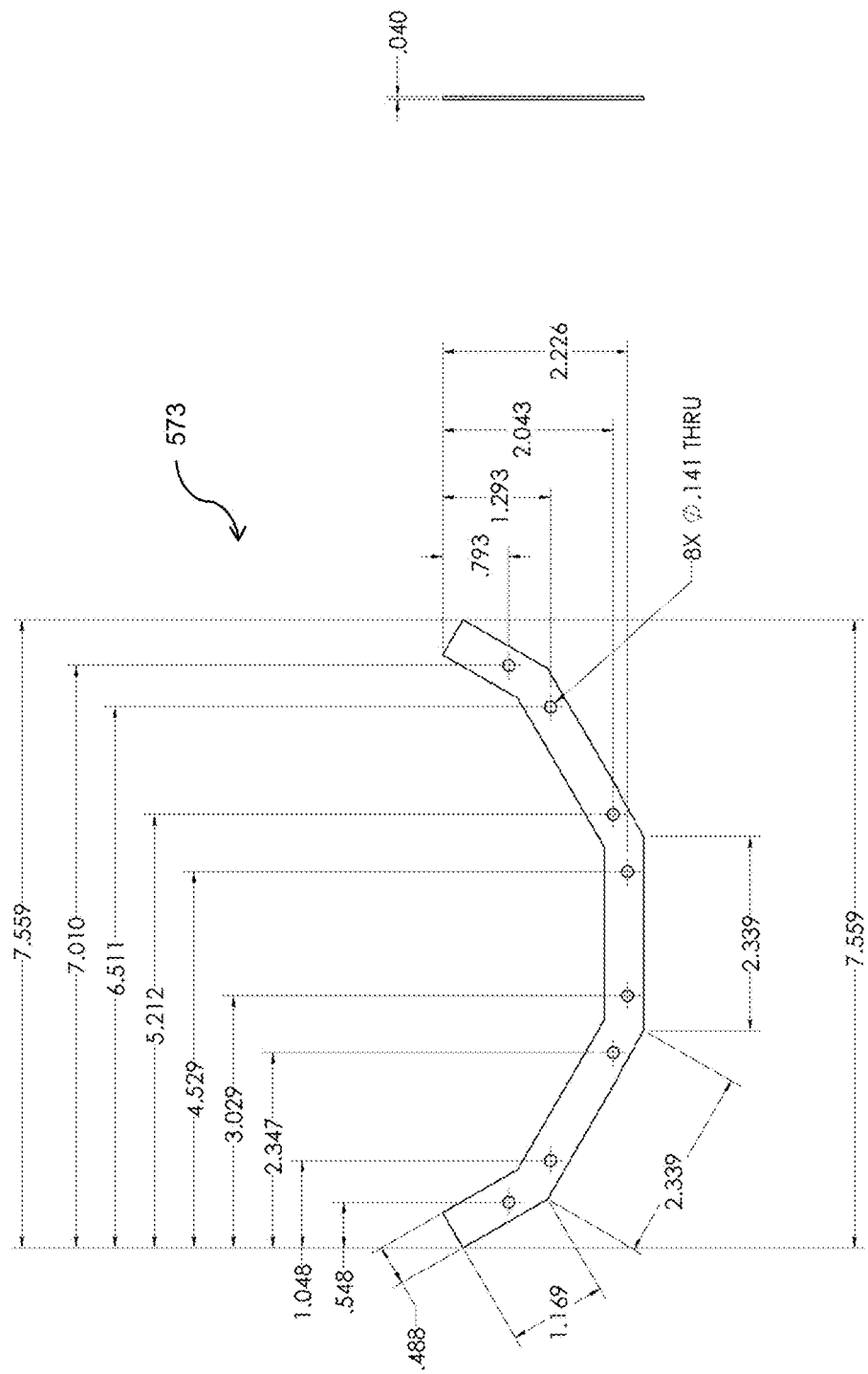

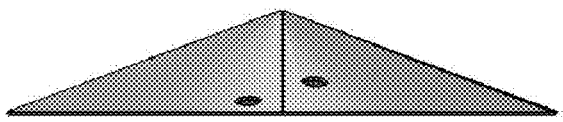
574
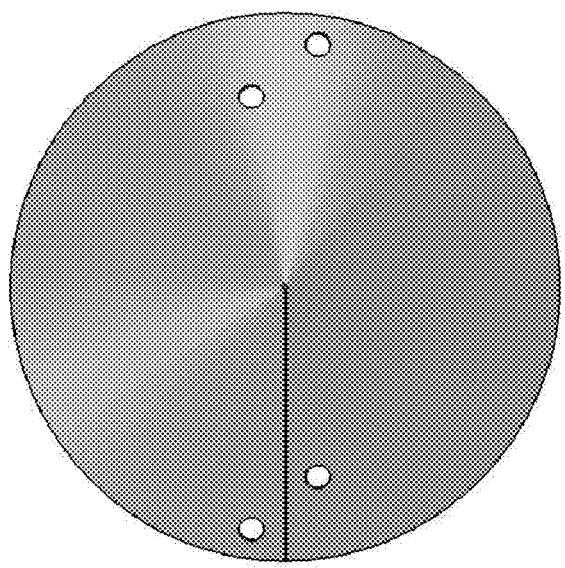
FIG. 5H
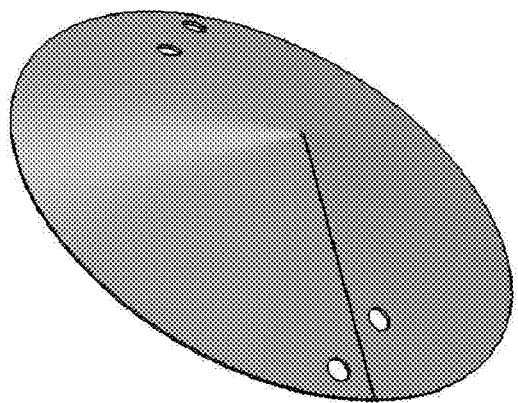

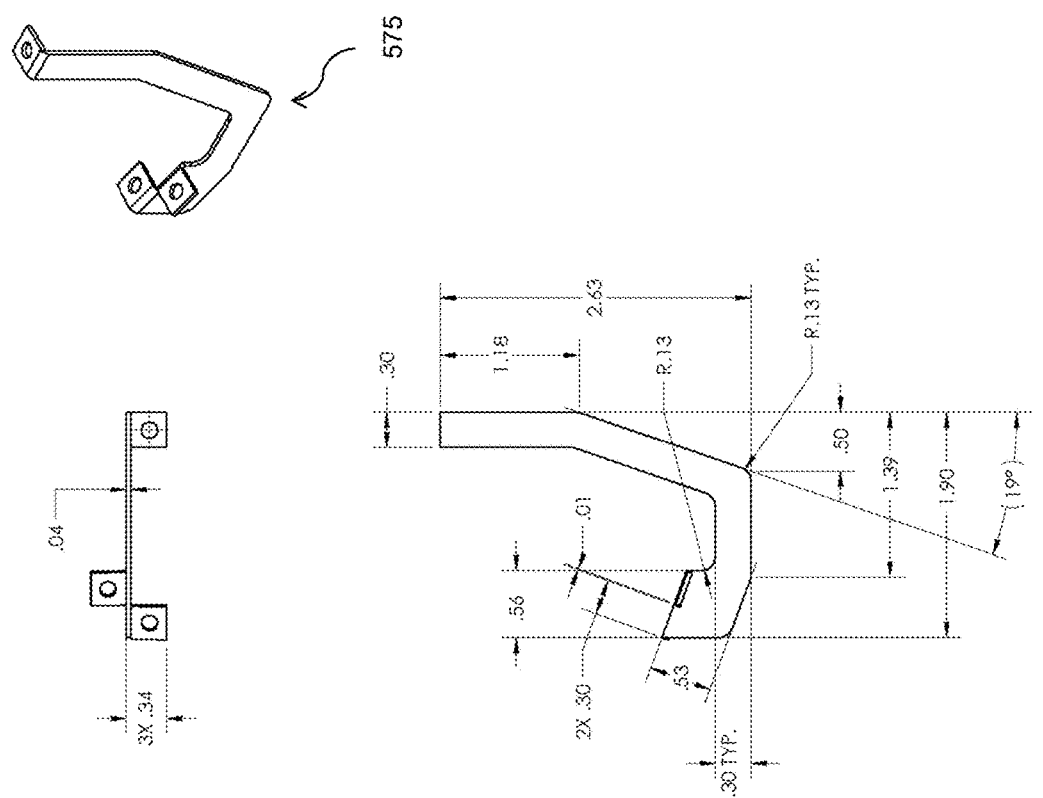

SYSTEMS AND METHODS FOR PROVIDING HIGH-MAST LIGHTING

CROSS-REFERENCE

This application is a Continuation Application which claims the benefit of U.S. application Ser. No. 15/145,475, filed May 3, 2016, which is a Continuation Application which claims the benefit of U.S. application Ser. No. 13/734,891, filed Jan. 4, 2013; which claims priority to U.S. Provisional Patent Application Ser. No. 61/583,496, filed on Jan. 5, 2012, each of which is incorporated herein by reference in its entirety.

BACKGROUND OF THE INVENTION

Large area lighting systems, such as high-mast systems provide various levels of illumination for a variety of applications. Large area lighting systems are often used to illuminate large areas such as highways, airports, maritime ports, or railroad yards. In densely populated areas, such large area lighting systems may result in light spillage, which may contribute to light pollution and sky glow.

Previously attempts to reduce light spillage have included placing shields or baffles on the lighting fixtures. Challenges may be faced with wind loads, especially for high-mast systems. Furthermore, traditional high mast systems also result in energy inefficiencies. Depending on the circumstances, different amounts or types of light may be needed for a particular application. Thus, a need exists for systems and methods of providing lighting which may result in greater energy efficiency and/or illumination control.

SUMMARY OF THE INVENTION

An aspect of the invention may be directed to a lighting unit comprising a plurality of light emitting plasma light sources, each light source of said plurality being at least partially surrounded by an optical element; and a high-mast support configured to support the light source above a surface. In some embodiments, the optical element may be a reflector containing one or more facets, directing the light toward the surface. In some embodiments, each light source of said plurality is partially surrounded by a separate optical element. In some configurations, each light source of said plurality may be independently dimmable. A lighting unit may have a communication unit capable of communicating with an external controller. One or more lighting characteristic of the light sources may be adjustable based on instructions from the external controller.

A lighting system may be provided in accordance with another aspect of the invention. The lighting system may comprise a plurality of lighting units, an individual lighting unit of said plurality having a light source at least partially surrounded by an optical element configured to direct light toward a surface; a high-mast support configured to support the light source above the surface; and a communication unit capable of wireless communications; and a host capable of determining a desired status for a light source of each of said plurality of lighting units, and sending instructions, via a gateway linking a plurality of lighting units, to the communication unit to an individual lighting unit of said plurality, thereby effecting said desired status for the light source of said individual lighting unit.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 3A shows a front view of the lighting unit. FIG. 3B shows an exemplary side view of the lighting unit. FIG. 3C shows a top view of the lighting unit. FIG. 3D provides a perspective view of the lighting unit.

FIGS. 4A and 4B show a lighting unit in accordance with another embodiment of the invention. FIG. 4A shows an exploded view of the lighting unit. FIG. 4B shows a perspective view of the lighting unit.

FIGS. 5A-5I show optical elements in accordance with an embodiment of the invention. FIG. 5A shows an example of optical elements provided for the lighting unit. FIG. 5B shows an additional of an optical element that may be provided for the lighting unit. FIG. 5C provides a possible schematic of an optical element used in a lighting unit. FIG. 5D shows an example of a reflector used in a lighting unit. FIG. 5E is an example of a fling top reflector. FIG. 5F is an example of a fling bottom reflector. FIG. 5G is an example of a main reflector. FIG. 5H is an example of a reflector cone. FIG. 5I is an example of a bracket meeting a cone reflector.

DETAILED DESCRIPTION OF THE INVENTION

While preferred embodiments of the invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention.

The invention provides systems and methods for providing illumination in accordance with aspects of the invention. Various aspects of the invention described herein may be applied to any of the particular applications set forth below or for any other types of high-mast or lighting applications. The invention may be applied as a standalone system or method, or as part of an energy-saving package, or software. It shall be understood that different aspects of the invention can be appreciated individually, collectively, or in combination with each other.

Figure 1:
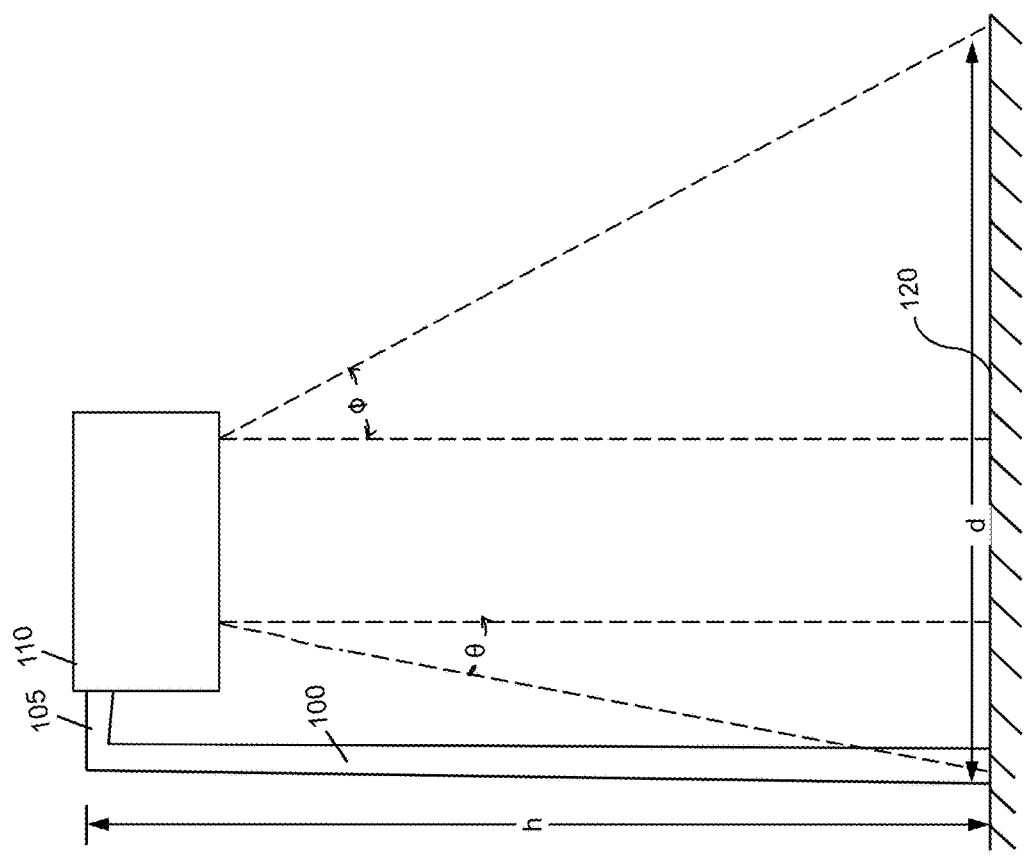
FIG. 1 shows an example of a high-mast lighting unit provided in accordance with an embodiment of the invention.

FIG. 1 shows an example of a high-mast lighting unit provided in accordance with an embodiment of the invention. The lighting unit may be a high-mast luminaire providing illumination to an area. A lighting unit may have a support 100 which may hold up a lighting fixture 110. The support may include a bend or an arm 105 which may connect the support to the lighting fixture.

The support 100 may support the lighting fixture so that it is elevated above a surface 120. For example, a surface may be the ground, water, a structure, or any other surface that may receive illumination from the lighting unit. The surface may be flat, curved, tilted, rough, smooth, or have any features. The surface may be a naturally occurring surface or may be man-made. The surface may include a road, highway, stadium, parking lot, fields, park, farms, land, forest, runway, warehouse, port, refinery, rig, ship, gas station, railway, interchanges, toll plazas, container yards, truck stops, correctional facilities, airports, security areas, sports locations, or any other surface. The lighting units may be provided indoors or outdoors. In some instances, the lighting units may be used in indoor high bay applications.

The support may be or may include a pole, beam, mast, tower, structure, wall, building, or any other type of mount. In some instances, the support may be provided below the lighting fixture, and/or to the side of the lighting fixture. In some instances, the support may be provided partially or completely above the lighting fixture (e.g., the lighting fixture may be hanging down off the support or may be suspended by the support). The support may include already existing structures for other functions, such as wind towers, broadcast towers, cellular towels, building walls or roofs, or onshore or offshore structures.

The support may be arranged vertically. A longitudinal axis extending through the support may have a vertical orientation. The support may or may not be perpendicular to the surface. The longitudinal axis may or may not be perpendicular to the surface.

The support may be a high-mast support. The support may elevate the lighting fixture s desired height h above the surface. In some embodiments, the height h may be greater than or equal to about 50 ft, 60 ft, 70 ft, 80 ft, 90 ft, 100 ft, 110 ft, 120 ft, 130 ft, 150 ft, 180 ft, 200 ft, 250 ft, or 300 ft. In some instances, the height may fall in the range of about 90 to 110 ft, 80 to 120 ft, or 70 to 150 ft. In some instances, the height may be less than about 150 ft, 160 ft, 180 ft, 200 ft, 250 ft, 300 ft, 400 ft, or 500 ft.

The lighting fixture may contain one or more light source therein. The lighting fixture may be capable of distributing light. The lighting fixture may be capable of illuminating at least a portion of the surface. In some instances, the lighting fixture may be capable of illuminating a large area of the surface. For example, the lighting fixture may illuminate an area of greater than or equal to about 10 sq. ft, 20 sq. ft, 30 sq. ft, 40 sq. ft, 50 sq. ft, 75 sq. ft, 100 sq. ft, 125 sq. ft, 150 sq. ft, 175 sq. ft, 200 sq. ft, 250 sq. ft, 300 sq. ft, 350 sq. ft, 400 sq. ft, 450 sq. ft, 500 sq. ft, 600 sq. ft, 700 sq. ft, 800 sq. ft, 1000 sq. ft, 1500 sq. ft, 2000 sq. ft, 2500 sq. ft, 3000 sq. ft, 4000 sq. ft, 5000 sq. ft, 7000 sq. ft, or 10000 sq. ft. In some embodiments, the lighting fixture may illuminate an area less than any of the values described herein, or about 12000 sq. ft, 15000 sq. ft, 20000 sq. ft, 30000 sq. ft, or 50000 sq. ft.

An illuminated area may have a dimension d which may be any dimension (e.g., length, width, diameter, diagonal). For example, dimension d may be greater than, less than, or equal to one or more of the following: or may fall between two or more of the following: about 3 ft, 5 ft, 10 ft, 15 ft, 20 ft, 25 ft, 30 ft, 40 ft, 50 ft, 60 ft, 70 ft, 80 ft, 90 ft, 100 ft, 120 ft, 150 ft, 200 ft, 250 ft, 300 ft, 350 ft, 400 ft, 500 ft, 600 ft, 700 ft, 800 ft, 900 ft, or 1000 ft.

The illuminated area may refer to an area having a desired or threshold degree of light intensity per area. For example, an area may be illuminated if it has greater than or equal to about: 0.1 footcandle (fc), 0.2 fc, 0.25 fc, 0.3 fc, 0.4 fc, 0.5 fc, 0.7 fc, 1 fc, 1.5 fc, 2.0 fc, 2.5 fc, 3.0 fc, 4.0 fc, 5.0 fc, 6.0 fc, 7.0 fc, 7.5 fc, 8.0 fc, 9.0 fc, 10 fc, 12 fc, 15 fc, 20 fc, 25 fc, 30 fc, 40 fc, 50 fc, 55 fc, 60 fc, 70 fc, 80 fc, 90 fc, or 100 fc.

In some embodiments, the light may be provided to an illuminated area with a uniform or substantially uniform degree of intensity. Alternatively, the degrees of intensity of the illuminated areas may vary. In some instances, a central portion of the illuminated area may have greater intensity than an edge of the illuminated area. In some embodiments, the light intensity may be dropped off rapidly, falling to less than half the light source's value at a certain distance from the epicenter. For example, the distance may be 5 feet, 10 feet, 20 feet, 30 feet, 40 feet, 50 feet, 60 feet, 70 feet, 80 feet, 90 feet, 100 feet, 120 feet, 150 feet, 200 feet, or 300 feet from the epicenter.

The lighting fixture may have one or more feature, such as one or more optical element or mask that may provide a desired illumination pattern. In some instances, the desired illumination pattern may provide a desired degree or distribution of light while reducing and/or minimizing light pollution.

Light may be provided from the lighting fixture at any angle. The lighting fixture may distribute light at uniform angles all around, or at different angles. For example, the lighting fixture may distribute light at a first angle $\theta$ and at a second angle $\varphi$, where $\theta$ and $\varphi$ may or may not have the same values. For example, $\theta$ may be greater than or equal to $\varphi$ or $\theta$ may be greater than or equal to $\varphi$. In some instances, $\theta$ and/or $\varphi$ may have a value falling between 0 and 90 degrees. For example, $\theta$ and/or $\varphi$ may have a value greater than, less than, or equal to one or more of the following, or falling between two or more of the following: about 0 degrees, 5 degrees, 10 degrees, 15 degrees, 20 degrees, 30 degrees, 40 degrees, 45 degrees, 50 degrees, 60 degrees, 70 degrees, 75 degrees, 80 degrees, 85 degrees, or 90 degrees. In some embodiments, the overall angle provided by a lighting fixture may have any range. For example, $\theta+\varphi$ may be greater than, less than, or equal to one or more of the following, or falling between two or more of the following: −15 degrees, −10 degrees, −5 degrees, 0 degrees, 5 degrees, 10 degrees, 15 degrees, 20 degrees, 30 degrees, 40 degrees, 45 degrees, 50 degrees, 60 degrees, 70 degrees, 75 degrees, 80 degrees, 85 degrees, or 90 degrees, 100 degrees, 110 degrees, 120 degrees, 130 degrees, 140 degrees, 150 degrees, 160 degrees, 170 degrees, or 180 degrees. The values for θ and/or φ may be the angles relative to a vertical direction (or parallel to the longitudinal axis).

A high-mast lighting unit may be provided in accordance with an embodiment of the invention. The high-mast lighting unit may be capable of illuminating a large area. Any description herein of a high-mast lighting unit may apply to any other type of lighting unit, and vice versa.

Figure 2:
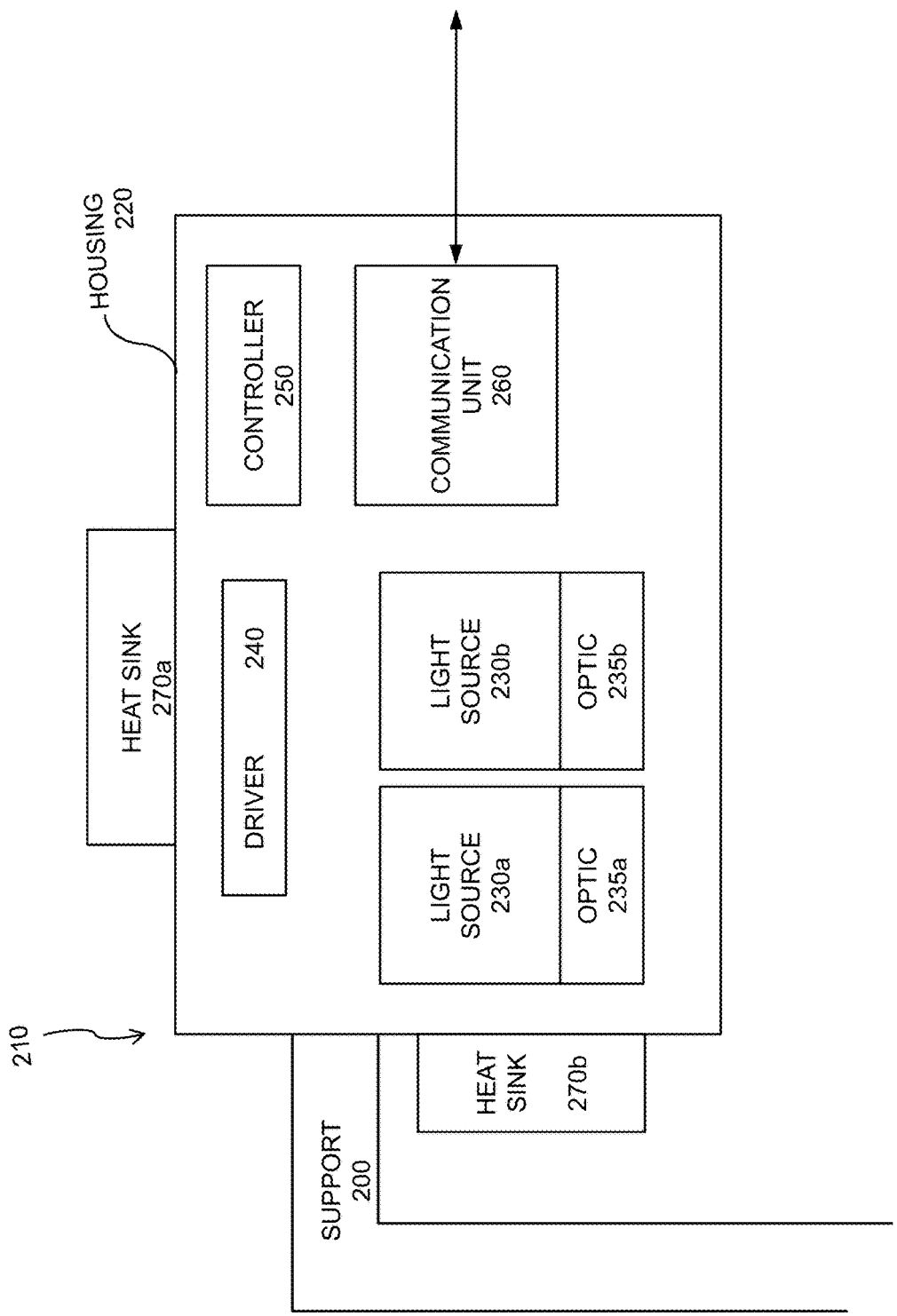
FIG. 2 shows a schematic of a lighting unit provided in accordance with an embodiment of the invention.

FIG. 2 shows a schematic of a lighting unit provided in accordance with an embodiment of the invention. A support 200 may be capable of supporting a lighting fixture 210.

A lighting fixture 210 may include a housing 220 which may partially or entirely enclose the lighting fixture. The housing may have any shape or configuration. The housing may have a box-like or rectangular shape, cylindrical shape, spherical shape, hemi-spherical shape, elliptical or egg-like shape, elongated curved or flat shape, multi-faceted shape, or any other shape. The housing may partially or entirely enclose the lighting fixture. The housing may have one or more open side that may not entirely enclose the lighting fixture. In one example, the bottom side of the housing may be open. The housing may include one or more walls. The walls may be flat, faceted, and/or curved.

The housing may be formed of an opaque material. Alternatively, the housing may be formed of a transparent or translucent material. In some instances, the housing may be formed of any combination thereof. For example, the housing may include an opaque top and/or side walls, but may have a transparent bottom. The optical transmissivity and/or lack thereof may be selected to provide a desired light distribution. For example, it may be desirable to direct the light downward, without permitting light to escape upward. Alternatively, it may be desirable to direct the light to a particular side without directing the light to another side. The housing may be opaque where it is undesirable to direct light. The housing may be open, or have a transparent or translucent enclosure in a direction where it is desirable to provide light.

The housing may be formed of a material with a high thermal conductivity and/or a low thermal conductivity. The housing may include a metal (e.g., aluminum, copper, silver, nickel, iron, gold, steel, titanium, or any other metals, alloys, or combinations thereof), plastic, polymer, composite, glass, or any other material. In one example, the housing may include 6061 copper-free aluminum. The housing may also include a cover which may be clear tempered glass. In some embodiments, the housing may include a cover which may be tempered glass (e.g., clear, prismatic, anti-reflective, and/or high transmittance).

The lighting unit may have one or more light source 230a, 230b therein. In some embodiments, a light source may be a light emitting plasma (LEP) light source. Any other light sources known in the art may be used (e.g., light emitting diode (LED), high pressure sodium (HPS), or any type of gas discharge lamp (e.g., fluorescent lamp, inductive lighting, hollow cathode lamp, neon lamp, argon lamp, plasma lamp, xenon flash lamp), electron stimulated lamp (e.g., cathodoluminescence, electron stimulated luminescence (ESL), cathode ray tube (CRT), nixie tube), incandescent lamp (e.g., carbon button lamp, incandescent light bump, halogen lamp, globar, Nernst lamp), electroluminescent (EL) lamp (e.g., LED, electroluminescent sheets, electroluminescent wires), or high-intensity discharge lamps (e.g., carbon arc lamps, ceramic discharge metal halide lamps, hydragyrum medium-arc iodide lamps, mercury vapor lamps, sodium vapor lamps, sulfur lamp, or xenon arc lamp). Some examples of LEP light sources may include a small dosing of inert gas and/or metal halide salts. In some embodiments, the system may comprise a quartz glass bulb mounted within a metal-coated ceramic waveguide. RF energy may be coupled into the waveguide, and the resulting high electric field may excite the contents of the bulb to generate a sustained plasma channel. If the bulb contains metal halide salts, these may be vaporized by the plasma and broadband light emission will occur. Any description herein of any light source may include any LEP light source, and vice versa.

An LEP light source may utilize any wattage. For example, a 560 W LEP light source may be used. The LEP light source may have a wattage greater than, less than, or equal to one or more of the following, or falling between two or more of the following: about 50 W, 100 W, 150 W, 200 W, 250 W, 280 W, 300 W, 350 W, 400 W, 450 W, 500 W, 530 W, 550 W, 570 W, 600 W, 650 W, 700 W, or 750 W. In one example, a lighting fixture may use two LEP sources each utilizing 280 W for a total system wattage of 560 W.

In some embodiments, a single lighting fixture may have a single light source therein. For example, a single light source may be at least partially enclosed or surrounded by a housing. Alternatively, a single lighting fixture may have a plurality of light sources therein. A plurality of light sources may be at least partially enclosed or surrounded by a housing. In one example, a lighting fixture may be a single lighting fixture containing one LEP light source therein. In another example, a lighting fixture may be a dual lighting fixture containing two LEP light sources therein. In some cases, a single lighting may provide equivalent or nearly equivalent light output as a dual or other lighting fixture. For example, the single lighting unit may contain one improved light source while the dual lighting fixture may contain two regular light sources. The improved light sources, as defined herein, may provide a stronger light beam than the regular light sources, a differently distributed light beam than the regular light sources and/or a light beam with other characteristics that differ from the regular light sources. Components of the lighting fixture (e.g., heat sinks, optics and/or any other components described with reference to FIG. 2 or elsewhere herein) used for improved and regular light sources may or may not have the same design. In an example, an improved light source may provide a stronger light beam, and may therefore require a more efficient heat sink. In another example, an improved light source may deliver a light beam with a light distribution that may require one or more optics to be configured differently. A lighting fixture may include one, two, three, four, five, six, seven, eight, nine, ten, eleven, twelve, or more light sources therein.

A single lighting fixture may use any number of light sources while having a total wattage consumption that may be less than or equal to any level described herein. Alternatively, the single lighting fixture may have any number of light sources where each light source has a wattage consumption that may be less than or equal to any level described herein.

The light sources may have any configuration or location relative to one another. A plurality of light sources may be within the same light fixture and/or housing. The light sources may be adjacent to one another. The light fixture and/or housing may or may not be symmetrical. The light sources may or may not be disposed within the housing symmetrically.

One or more optical element 235a, 235b, may be provided for a light source 230a, 230b. An optical element may manipulate and/or modify light emitted from the light source. An optical element may be reflective, refractive, transparent, translucent, may filter or direct light, or may have any other optical property. The optical element may or may not alter the wavelength of light as emitted by the light source. The optical element may focus, concentrate, diffuse, or alter the pattern of light emitted by the light source. The optical element may include a mirror, lens, filter, or any other type of optical element. Light may or may not pass through the optical element.

The optical element may partially or completely enclose the light source. In one example, the optical element may be a reflector that may at least partially surround the light source. The optical element may have an open end at the bottom, and may surround the light source on the sides and/or top. The optical element may be located above the light source and/or behind the light source. The optical element may be on the side of the light source opposite a direction of illumination of the lighting fixture. The optical element may or may not contact the light source. The optical element may have one or more curved and/or faceted surface. The optical element may be formed of multiple parts. Additional examples or features of the optical element may be described in greater detail below.

The optical element may be designed to direct the light in a preferred direction. In one example, the optical element may be designed to direct the light downward. The optical element may be designed to direct the light to a desired surface, whether the surface be downward, sideways, upwards, or any combination thereof. The optical element may also be designed to direct the light to a desired area of illumination. For example, the optical element may focus the light to a smaller area, or may spread the light to a larger area. The optical element may also be designed to provide a desired pattern of illumination, which may include a desired pattern of light intensity. For example, the light intensity may be even over the area or may have concentrated or dispersed areas.

In some instances, a light source may be in optical communication with a single optical element, such as a reflector. Alternatively, the light source may be in optical communication with a plurality of optical elements. For example, a light source may have a reflector behind it, and a lens in front of it. The lens may alter the path and/or characteristics of the light.

In some embodiments, a lighting fixture may have a plurality of light sources, and each light source of said plurality may be at least partially surrounded by an optical element. In some instances, a plurality of light sources may be surrounded by the same optical element, or each light source of a plurality may be surrounded by a separate optical element. For example, a first light source may be surrounded by a first optical element, and a second light source may be surrounded by a second optical element. In some instances, a plurality of optical elements may be provided per light source. The plurality of optical elements for a single light source may be the same or different types of optical elements. In one example, a lighting fixture may be a single lighting fixture with one light source, and one reflector. In another example, a lighting fixture may be a dual lighting fixture with two light sources, and two reflectors, each reflector corresponding to a separate light source.

The optical element may be fixed with respect to the light source. Alternatively, the optical element may be movable relative to the light source. The optical element may be movable to focus and/or direct the light as desired.

The lighting fixture 200 may also include a driver 240. The driver may be electrical communication with one or more light source 230a, 230b. In some instances, a single driver may be in communication with a single light source, or a single driver may be in plurality of light sources or vice versa. In another example, a plurality of drivers may be provided for a plurality of light sources. The driver may be used to control the output of the light source(s). The driver may cause a light source to be turned on or off. The driver may control the energy provided to provide a desired dimming level for one or more light source.

A power supply may also be provided. The power supply may be connected to one or more power source. The power supply may also be connected to the driver. The driver may be connected to the light source. In some instances, AC power may be provided to the power supply. The power may be provided by main feed lines or other sources. The power supply may convert the AC power to DC power, which may be provided to the driver. The driver may take the DC power and provide RF power to the light source. The light source may provide visible, IR and/or UV light.

A plurality of light sources may be independently controllable. For example, the plurality of light sources may be independently turned on and/or off. The plurality of light sources may be independently dimmable. For example, each light source may be maintained at or adjusted to a desired dim level. For example, if each light source, when turned on to max capacity is outputting 100%, each light source may be dimmable so that it is outputting light at any value between 0 and 100%. In some instances, the light source may be dimmable anywhere along the scale from 0 to 100%, or at discrete steps/points along the scale. In some instances, the light source may be dimmable along the scale from 20% to 100%. The light source may be dimmable between a threshold percentage value below which a driver shuts down the communication and 100%. The light source may output light at about 0%, 20%, 25%, 30%, 40%, 45%, 50%, 55%, 60%, 65%, 70%, 75%, 80%, 85%, 90%, 95%, or 100%. If each light source is independently dimmable to different levels, and multiple light sources are provided, this may provide additional levels of overall control of light level emitted by the light fixture. For example, if each light source is an LEP light source that is dimmable to the closest 20%, and two light sources are provided, this may provide a degree of control of up to 10% for the entire light fixture.

A lighting fixture may optionally contain a ballast assembly. In some embodiments, the driver may be a ballast assembly or may provide the same functions as a ballast assembly. The ballast assembly may or may not be thermally connected to a heat sink. The ballast may be copper wound with a desired power factor (e.g., 80%, 85%, 90%, 95%). The ballast components may be removable and may permit quick disconnect assembly for maintenance. A starter may sense an inoperative or missing light source, and may automatically shut down to prevent runaway operation, shortened life, and/or damage to secondary ballast windings.

A lighting fixture 200 may include a controller 250. The controller may provide one or more instructions that may control the operation of the lighting fixture. For example, the controller may provide instructions to a driver 240 which may cause a desired light level to be output from one or more light sources 230a, 230b. For example, the controller may instruct a driver to turn a light source on and/or off, or to dim the light source to a desired level.

The lighting fixture 200 may also include a communication unit 260. The communication unit may permit communications of the lighting fixture with one or more external device. For example, the lighting fixture may communicate with one or more external controller which may provide instructions to the lighting fixture. The lighting fixture also provide information to the external controller. One-way and/or two-way communications may be provided between the lighting fixture and the external controller. Additional details and examples are provided below.

The communication unit may be capable of wired and/or wireless communications. The communication unit may communicate over a network. For example, the communication unit may communicate over a local area network (LAN), or wide area network (WAN) such as the Internet. The communication unit may communicate over a telecommunications network, such as a cell-phone or data network. The communication unit may community with proximity-based interactions, such as Bluetooth, Zigbee, IR, or any other type of communications. Additional examples are provided below. See, e.g., IEEE Standard 802.15.4d-2009, (Apr. 17, 2009); IEEE 702.15.4 Wireless Networks User Guide, JN-UG-3024 (Oct. 6, 2006); JenNet Stack User Guide, JN-UG-3041 (Sep. 28, 2010); JN51xx Integrated Peripherals API User Guide, JN-UG-3066 (Jun. 30, 2011), which are hereby incorporated by reference in their entirety.

One or more heat sink 270a, 270b may be provided on a lighting fixture 200. The heat sink may be provided on the exterior of the housing. The heat sink may include one or more fins, channels, grooves, protrusions, bumps, sheets, or any other surface feature. The heat sink may be provided on a top surface, side surface, and/or bottom surface of the lighting fixture. The heat sink may be in thermal communication with one or more heat producing portion of the lighting fixture. For example, the heat sink may be in thermal communication with a driver, power supply, and/or light source of the lighting fixture.

Figure 3A:
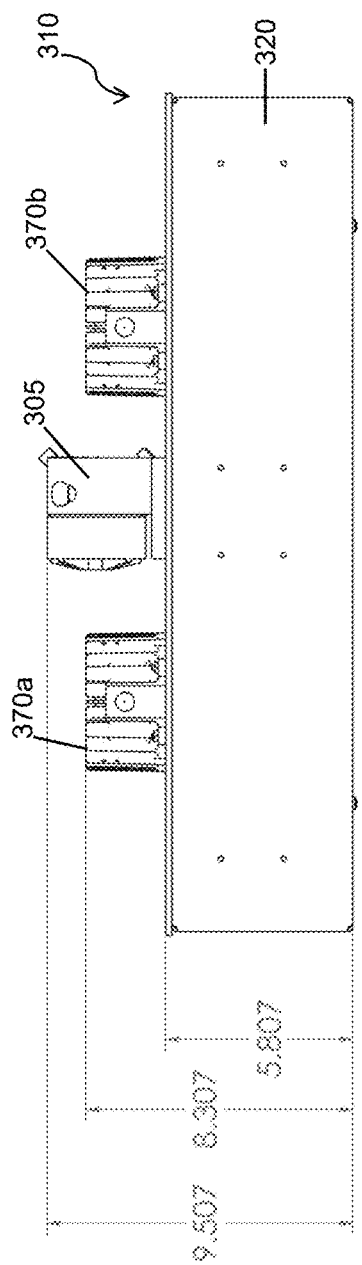
FIGS. 3A-3D show an example of a lighting unit provided.

FIGS. 3A-3D show an example of a lighting unit provided. An exterior of a lighting fixture may be shown. FIG. 3A shows a front view of the lighting unit. The lighting unit may include a housing 320 for the lighting fixture 310. One or more support interface 305 may be provided, useful for connecting the lighting fixture to a support.

The housing 320 may have a rectangular shape. The housing may include one or more walls that may surround one or more portions of the lighting fixture.

One or more heat sinks 370a, 370b may be provided on the housing 320. In some instances, the heat sinks may be mounted on a top portion of the housing. The heat sinks may be in thermal communication with one or more heat-producing component therein. In some examples the heat sinks may be in thermal communication with a light source and/or driver. The heat sinks may be directly contacting the heat-producing component or may be contacting the heat-producing component through a thermally conductive material. The housing and/or heat sinks may be formed from a thermally conductive material. Examples of thermally conductive materials may include materials have a thermal conductivity of greater than or equal to about 1 W/mK, 50 W/mK, 100 W/mK, 150 W/mK, 200 W/mK, or 250 W/mK.

The heat sinks may have one or more fin or ridge. In some instances, the may be provided in a radially extending pattern.

Figure 3B:
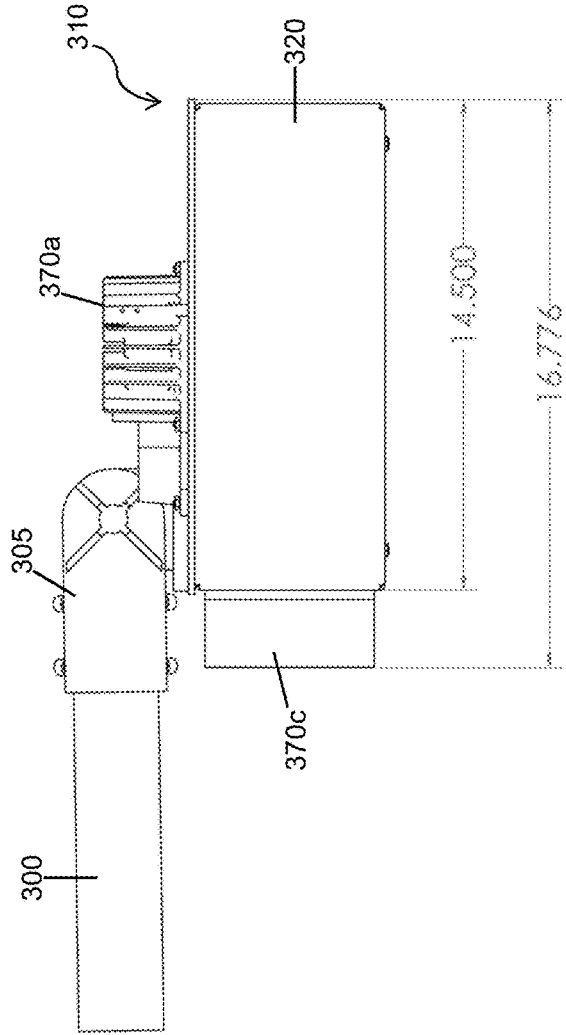

FIG. 3B shows an exemplary side view of the lighting unit. A lighting fixture 310 may be connected to a support 300 via one or more support interface 305. The support interface may permit the lighting fixture to pivot about one or more axis, thereby adjusting an angle of the lighting fixture with respect to the support. For example, the angle of the lighting fixture may be adjustable in one, two, or three directions. Adjusting the angle of the lighting fixture may adjust the area that is illuminated by the lighting fixture. The lighting fixture may be aimed so that the area of illumination is directly below the lighting fixture. Alternatively, the lighting fixture may be angled so that the area of illumination is partially below the lighting fixture, is offset below the lighting fixture, or is any other direction.

The angle may be adjusted in response to a manual adjustment. Alternatively, the angle may be adjusted in response to one or more actuation mechanism. The actuation mechanism may cause the angle to be adjusted in response to one or more signal.

The support interface may or may not allow the lighting fixture to slide along the support. The support interface may or may not permit the lighting interface to be raised upward or downward with respect to the support.

The lighting fixture 300 may have a housing 320. The housing may have a box-like shape or any other shape. One or more heat sink 370a, 370c may be provided in accordance with an embodiment of the invention. For example, a heat sink 370a may be mounted on top of the housing, while another heat sink 370c may be mounted on a side of the housing. The heat sinks may be mounted in the proximity of a heat-producing component contained within the housing.

Figure 3C:
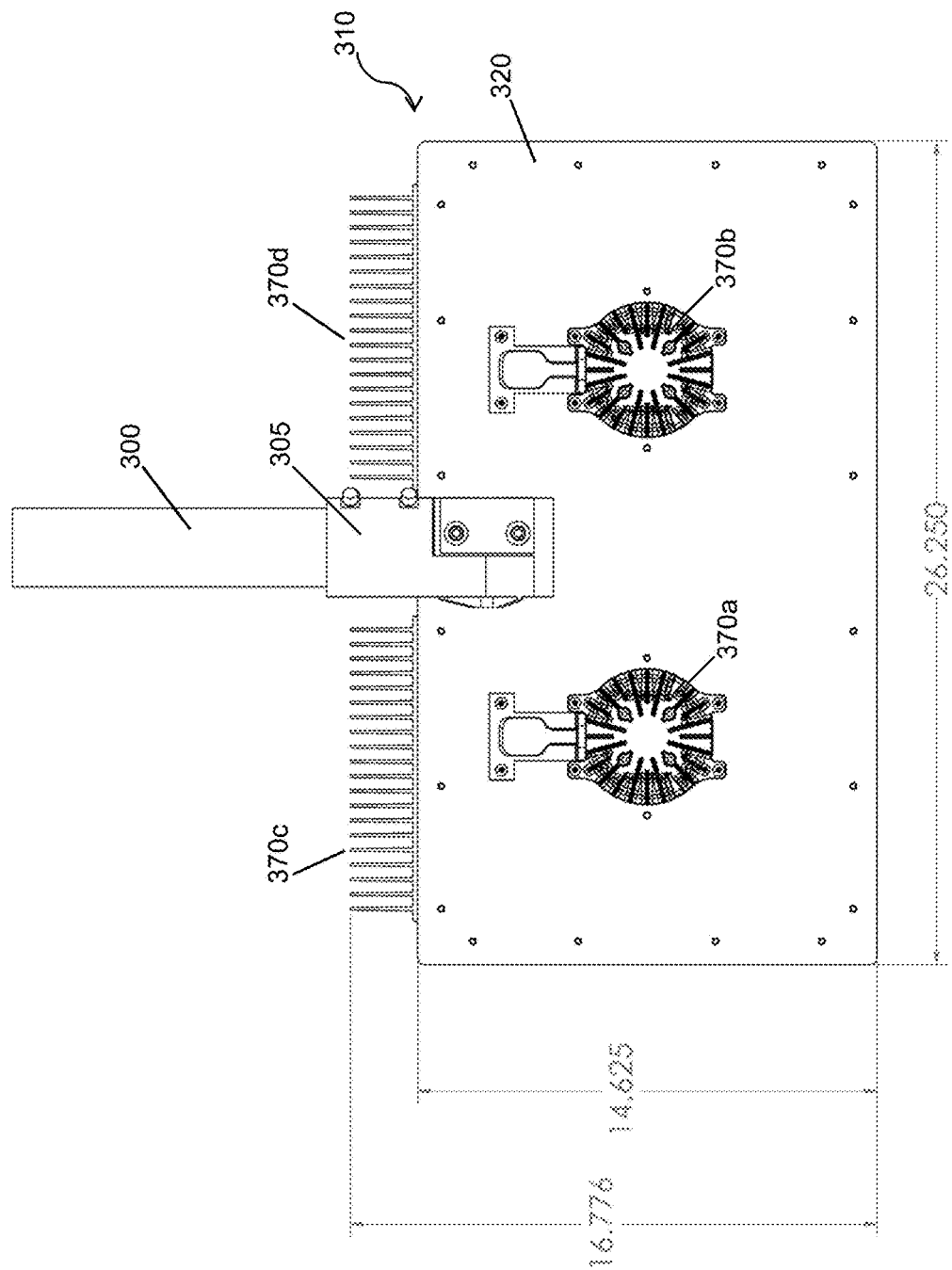

FIG. 3C shows a top view of the lighting unit. A lighting fixture 310 may be connected to a support 300 via a support interface 305.

The housing 320 may have a rectangular shape, or any other shape. The housing may have any size of footprint. For example, the housing may have a footprint of greater than, less than, or equal to one or more of the following, or falling between two or more of the following: 1 sq. in, 3 sq. inches, 6 sq. inches, 9 sq. inches, 12 sq. inches, 15 sq. inches, 18 sq. inches, 21 sq. inches, 24 sq. inches, 30 sq. inches, 36 sq. inches, 42 sq. inches, 50 sq. inches, 70 sq. inches, 100 sq. inches, 120 sq. inches, 150 sq. inches, 200 sq. inches, 250 sq. inches, 300 sq. inches, 400 sq. inches, 500 sq. inches, 600 sq. inches, 700 sq. inches, 800 sq. inches, 900 sq. inches, or 1000 sq. inches. One or more dimension of the housing (e.g., length, width, height, diagonal, or diameter), may be greater than, less than, or equal to one or more of the following, or falling between two or more of the following: 0.1 inches, 0.5 inches, 1 inch, 1.5 inches, 2 inches, 3 inches, 4 inches, 5 inches, 6 inches, 7 inches, 8 inches, 9 inches, 10 inches, 12 inches, 14 inches, 15 inches, 16 inches, 18 inches, 20 inches, 22 inches, 24 inches, 26 inches, 28 inches, 30 inches, 35 inches, 40 inches, 45 inches, 50 inches, 60 inches, 70 inches, or 100 inches.

A plurality of heat sinks 370a, 370b, 370c, 370d may be provided. One or more of the heat sinks 370a, 370b may be provided on a top surface of the housing. One or more heat sinks 370c, 370d may be provided on a side surface of the housing. The heat sinks may have one or more fins. The fins may be vertically oriented. In some embodiments, the fins may be radially extending. Alternatively, the fins may be provided in a parallel fashion. The fins may be oriented so that space provided between the fins open up above the heat sinks.

Figure 3D:
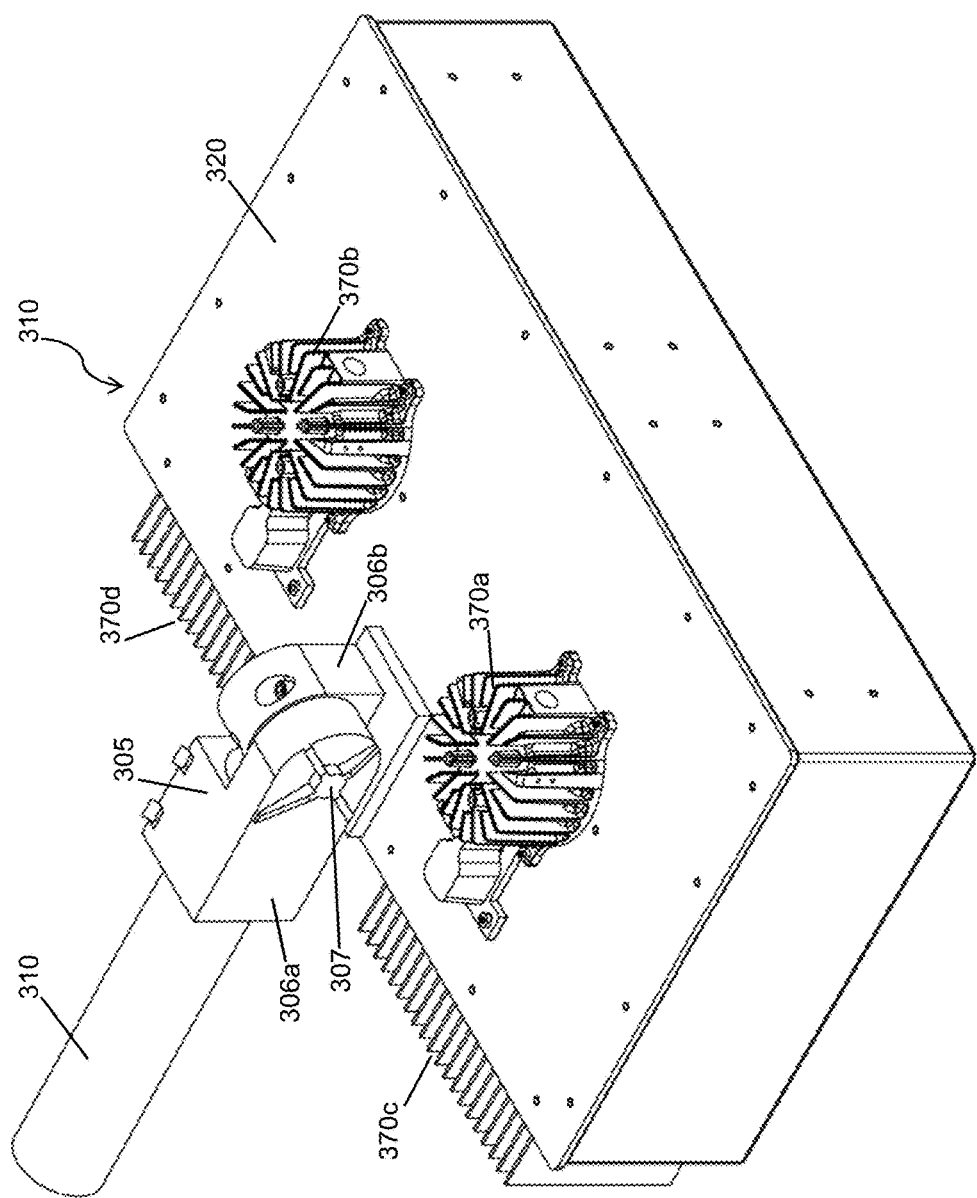

FIG. 3D provides a perspective view of the lighting unit. The lighting fixture 310 may be connected to the support 310 via a connection interface 305. The connection interface may include one or more hinge or pivoting mechanism 307, that may allow the lighting fixture to rotate about an axis passing through the pivoting mechanism. The connection interface may include two or more portions 306a, 306b that may move relative to one another. One portion 306a may be affixed to the support, while another portion 306b may be affixed to the lighting fixture.

The lighting fixture may have a housing 320. The housing may include a top surface and/or one or more side surfaces. In some instances, the housing may have a top surface and four side surfaces. The housing may enclose or at least partially surround one or more components therein. One or more heat sinks 370a, 370b, 370c, 370d may be provided on the housing. The heat sinks may be directly attached to the housing surface. The heat sinks may be in thermal communication with the housing.

FIGS. 4A and 4B show a lighting unit in accordance with another embodiment of the invention. The lighting unit may include a lighting fixture 410 which may be supported by a support 400. The support may or may not be a high-mast support. The lighting unit may include one or more light source, such as an LEP light source. In some embodiments, the lighting unit may include two light sources. For example, the lighting unit may be a high-mast dual-LEP lighting unit.

FIG. 4A shows an exploded view of the lighting unit. The lighting unit may include a lighting fixture 410 supported by a support 400. The lighting fixture may include a housing 420. The housing may have any shape, such as those described elsewhere herein. The housing may include a top surface and/or a plurality of side surfaces. The housing may at least partially enclose one or more components therein. In some instances, a doorframe assembly 422 may be provided. The doorframe assembly may or may not be part of the housing. The doorframe may cover a bottom portion of the lighting fixture. The doorframe may have a transparent and/or translucent surface. Light may be capable of passing through the doorframe assembly. In some instances, light is not capable of passing through the rest of the housing. For example, light does not pass through the sides or the top of the lighting fixture.

One or more light source 480a, 480b may be provided within the lighting fixture. In one example, two light sources are provided within the fixture, to provide a dual-source lighting unit. Any number of light sources may be provided. The light source may be a LEP light source.

One or more optical element may be provided. For example one or more reflectors 485a, 485b may be provided. A reflector may at least partially surround a light source 480a, 480b. In some instances, a reflector may surround a light source around its sides and/or top. The reflector may or may not surround a bottom portion of the light source. A reflector may surround a single light source. Alternatively, a reflector may surround a plurality of light sources. In some instances, a plurality of reflectors may be provided, each surrounding a single light source or a plurality of light sources. A reflector may include one or more surface that may reflect light from a light source a desired direction. In some instances, the reflector may direct the light from the light source through the doorframe assembly.

An optical element may surround the light source sufficiently to prevent light from traveling in an undesired direction. For example, light from a first light source surrounded by a first reflector may not reach a second light source surrounded by a second light reflector. In some instances, a reflector may not permit light to pass through the reflector.

In some instances, an additional structure, such as a cup or lighting component surface 487 may be provided. The lighting component surface may be formed of an opaque material. The lighting component surface may not permit light to pass through the lighting component surface. The lighting component surface may partially or completely surround a reflector and/or light source. The lighting component surface may keep the reflector and/or light source in a desired position within the housing.

An EMC cover 490a, 490b may be provided. In some embodiments, an EMC cover may be provided for each lighting component assembly within a light fixture. For example, an EMC cover may be provided for each light source. A lighting component assembly may include a lighting component surface 487, reflector 485a, light source 480a, and the EMC cover 490a. An EMC cover may be mounted to a tab 492 or other portion of the housing. A tab may have a mounting hole 493 which may be configured to accept one or more fastener. One or more mounting screws 494 may be used to connect the EMC cover to the tab. An EMC cover may be attached to a housing using any other techniques or fastening mechanisms including but not limited to screws, rivets, clamps, snapping features, sliding features, locking features, adhesives, welding, soldering, hook and loop fasteners, or ties. In some instances an EMC O-ring 496 or other interfacing component may be provided. The o-ring may be provided between the EMC cover and/or the lighting component surface. The o-ring may provide a resilient interface between the EMC cover and the lighting component surface. The EMC cover may prevent light from leaking in an undesirable manner.

One or more heat sinks 470a, 470b, 470c may be provided on a lighting fixture. The heat sinks may be provided on one or more side of the lighting fixture. The heat sinks may be provided on opposing sides of the light fixture. In some instances, heat sinks may be provided on adjacent sides of the light fixture. The heat sinks may be mounted to an exterior of the housing. The heat sinks may be in thermal communication with the housing.

The heat sinks may be in thermal communication with one or more component within the housing. For example, the heat sinks may be in thermal communication with a light source, and/or driver for the light source. In some embodiments, one or more heat sink or groups of heat sinks may be provided per light source. For example, if two light sources 480a, 480b are provided, two heat sinks 470a, 470b may be provided. In some instances, one or more heat sinks 470c may be shared between the light sources.

The heat sink may remove heat from the lighting fixture. The heat sink may include one or more fins that may assist with the dissipation of heat from the lighting fixture. The fins may be vertically oriented. Air may pass between the fins in a vertical direction.

FIG. 4B shows a perspective view of the lighting unit. The lighting fixture 410 may be connected to the support 400. The lighting fixture may include a housing 420, with one or more heat sinks 470a, 470b, 470c disposed thereon. A doorframe assembly 422 may form a portion of the housing. The doorframe assembly may include an optically transmissive portion. The doorframe assembly may be on a side of the housing in the direction in which light is emitted by the lighting fixture. In some instances, the doorframe assembly is on a bottom of the lighting fixture. Alternatively, the lighting fixture may be angled so that the doorframe assembly is at the bottom, side, top, or any combination thereof. The housing and doorframe assembly may contain and/or enclose one or more internal components of the lighting fixture.

Examples of internal components may include one or more light source 480a, 480b. Furthermore, the internal components may include one or more optical element 485a, 485b, and one or more EMC cover 490a, 490b. The internal components may be arranged so that light from the light source is directed through the doorframe assembly 422. The internal components may be arranged so that each light source is self-contained. For example, light from one light source may not reach another light source directly and/or indirectly. The internal components may include drivers and/or power supplies for the light sources.

In some instances, a doorframe assembly 422 may be removable from the rest of the housing 420. For example, one or more connector of the doorframe assembly may be unscrewed. One or more light source may be removed and/or replaced once the doorframe assembly is removed and/or opened. In some instances, the light source may be removed and/or replaced without requiring the removal or adjustment of any other component. Alternatively, an EMC cover, light component surface, and/or optical element may be removed and/or adjusted when removing and/or replacing the light source. In some instances, to replace a light source of an individual lighting component assembly, only that individual lighting component assembly may be adjusted or removed, without affecting other lighting component assemblies.

In some instances, a quick disconnect assembly may be provided, which may permit tool-free lamp replacement, thereby permitting ease of maintenance. For example, a light source may be easily electrically and/or physically disconnected, thereby permitting simplified replacement.

The lighting fixture may be contained within a compact form provided by the housing. The lighting fixture may have a relatively small footprint (e.g., such as the dimensions described earlier), which may advantageously reduce windloading. The lighting fixture may or may not have an aerodynamic shape.

In some embodiments, the lighting units and fixtures in FIGS. 3-4 may be adapted for containing a single light source. Such configurations may include, for example, locating a single light source (e.g., the light source 480b) and corresponding heat sinks (e.g., the heat sinks 370a, 470b and 470c) symmetrically (i.e., along the same axis of symmetry) with respect to a connection interface (e.g., the connection interface 305). The lighting fixture may further include an EMC cover (e.g., the EMC cover 490b) and/or a doorframe assembly (e.g., the doorframe assembly 422) centered on the single light source. One or more of the structural fasteners, mounting arrangements and/or other lighting fixture components shown in FIGS. 3-4 may be moved, adapted or otherwise transformed in the single light source configuration. One or more additional components may also be provided. For example, heat sinks may be provided along the side walls of the lighting fixture housing (e.g., the housing 420) in addition to the heat sinks 470b and 470c, allowing heat sinks to be located along all four side walls of the housing. Such a configuration may be advantageously used to achieve, for example, higher heat transfer rates in single lighting fixtures with improved light sources.

Figure 5A:
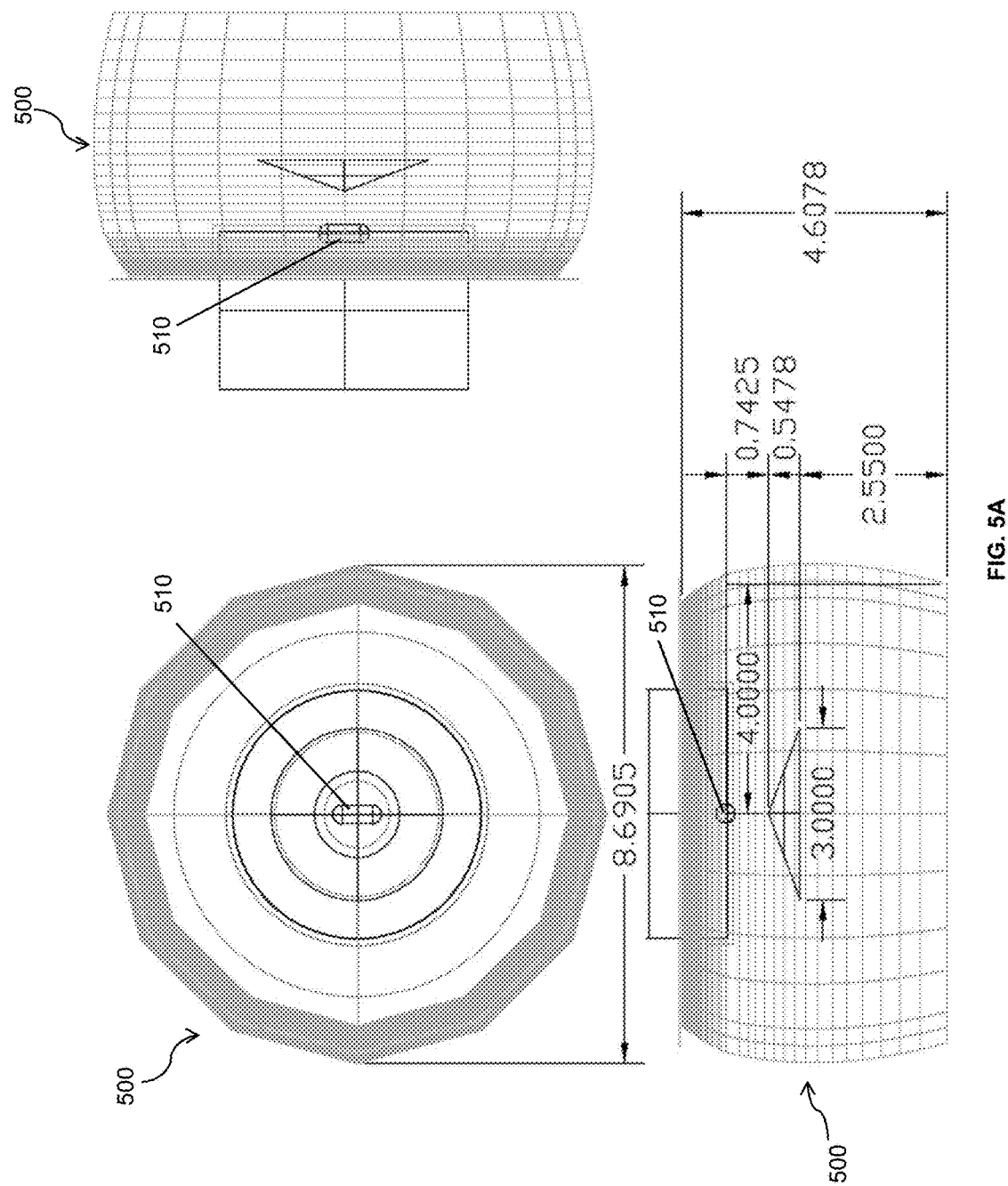

FIG. 5A shows an example of an optical element provided for the lighting unit. The optical element may be a reflector 500, which may have a polygonal shape. For example, the reflector may have a regularly polygonal cross-sectional shape, such as a circle, triangle, square, pentagon, hexagon, heptagon, octagon, nonagon, decagon, hendecagon, dodecagon, or any other polygon having any number of sides (e.g., 3 or more, four or more, five or more, six or more, eight or more, 10 or more, 12 or more, 16 or more, 20 or more, 25 or more, 30 or more, or 40 or more sides). The reflector may be symmetric, or asymmetric.

An optical element may have any size. For example, the optical element may have a dimension (e.g., length, width, height, diagonal, diameter) that may be greater than, less than, or equal to about one or more of the following, or fall between two or more of the following: about 0.5 inches, 1 inch, 1.5 inches, 2 inches, 2.5 inches, 3 inches, 3.5 inches, 4 inches, 4.5 inches, 5 inches, 5.5 inches, 6 inches, 7 inches, 8 inches, 8.5 inches, 9 inches, 10 inches, 11 inches, 12 inches, 13 inches, 15 inches, 17 inches, 20 inches, 25 inches, 30 inches, or 40 inches. The optical element may have a greater cross-sectional dimension than a height. For example, the ratio of the cross-sectional area to the height may be about 5:1, 4:1, 3:1, 2:1, 8.7:4.6, 3:2, 4:3, 5:4, or any other ratio.

The optical element may have any number of facets. One or more facet of the optical element may be flat, curved, or any combination thereof. The facets may correspond to the number of sides of optical element. The number of facets may correspond to a whole number multiplier of the number of sides of the cross-sectional shape of the optical element. For example if the optical element has twelve sides along its cross-sectional shape, there may be 12 facets, 24 facets, 36 facets, 48 facets, or any other number of facets.

A side profile of an optical element may provide an overall curve in the shape of the optical element. One or more curve may be provided at a top portion of the optical element profile. In some instances, one or more curve may be provided at a bottom portion of the optical element profile. In some instances, the top curve and bottom curve may be in the same direction. For example, both curves may occur inward toward the interior of the optical element. In some instances, the overall degree of curvature of the top curve may be about the same as the overall degree of curvature of the bottom curve. In other embodiments, the curvature at the top curve may be greater than the curvature of the bottom curve, or vice versa.

In some embodiments, a greater area density of facets may be provided at a top portion of the optical element than at a bottom portion of the optical element. In some instances, a greater density of facets may be provided where the optical element has a greater degree of curvature. In some instances, the optical element have a greater density of facets closer to a light source.

An optical element may be formed from a reflective material, thereby forming a reflector. In some instances, the optical element may have a shiny or mirrored surface. In some instances, the optical element may include a metal or be formed from a metal. For example, an optical assembly may include a specular enhanced aluminum panel. In another example, the optical element may include formed aluminum reflectors with anodized finish. The optical element may have a smooth or rough surface. The optical element may or may not be optically transmissive. Light may or may not pass through the optical element. In some instances, the optical element may reflect the light to provide it in a desired direction.

An optical element may be assembled from multiple components, such as, for example, from individual facets and/or other corresponding segments or parts. The facets and/or other segments or parts (collectively referred to as "optical element components" herein) may be assembled without being permanently joined together. In one example, facets or other optical element components may form a compound shape by being held or pressed together mechanically ("sandwiched") in a predetermined configuration between two or more plates or other support members (e.g., between the support 400 and a corresponding support member). In the absence of the mechanical stress holding the optical element components together, the optical element components may fall apart. In some cases, the plates and/or support members may include grooves, clips, ribs, non-slip surfaces, stops, pins, ridges, and/or other structural features to hold the optical element components in place in a desired configuration. Alternatively, the optical element components may be permanently joined together (e.g., using adhesive, melting or welding of seams, or any other connection means known in the art).

The optical elements may be separately formed and assembled together to form a compound shape. In some cases, one or more of the optical element components may be formed together. Alternatively, each optical element component may be formed separately. Furthermore, each optical element component may itself be a compound or hybrid component. For example, each facet or other optical element component may comprise a first base layer and a second reflective layer that is coated or otherwise joined with the base layer. In yet another example, one or more optical element components may be integrally formed, and subsequently cut or separated into individual pieces to enable assembly into a compound shape. Combinations and/or variations of forming and assembling the compound/hybrid optical element components may be used. For example, first portions of two or more of the optical element components may be integrally formed and then cut or separated into individual pieces (e.g., a flat sheet of a flexible base layer may be cut into individual first portions). Second portions of the two or more optical elements may be individually joined with the first portions after the first portions have been separated (e.g., a stiffening reflective coating may be deposited after separation).

One or more light source 510 may be partially or completely surrounded by the optical element 500. The light source may be a light emitting plasma light source, or any other type of light source described elsewhere herein. The light source package may have any shape or configuration. In one example, the light source may be pill-shaped. Alternatively, the light source package may be tubular, spherical, or have any other shape or configuration. The light source may be a Topanga source. In some instances, the light source may be a Ceravision or Luxim light source, such as Luxim STA 41 source or STA75 source.

In some instances, the light source may have a small footprint compared to the optical element. For example, the ratio of the cross-sectional areas of the light source to the optical element may be greater than, less than, or equal to one or more of the following, or fall between two or more of the following: about 1:10,000, 1:5,000, 1:1,000, 1:700, 1:500, 1:300, 1:200, 1:100, 1:90, 1:80, 1:70, 1:60, 1:50, 1:40, 1:30, 1:20, 1:15, 1:10, 1:9, 1:8, 1:7, 1:6, 1:5, 1:4, 1:3, or 1:2.

The light source may be positioned within the optical element at any position. In some instances, the light source may be provided at the center of the cross-sectional area of the optical element. The center of the light source may be equidistant from the sides of a cross-sectional area of the optical element.

The light source may be positioned anywhere along the height of the optical element. In some instances, the light source may be positioned at or near the top of the optical element. For example, the center of the light source may be within the top 50%, 40%, 35%, 30%, 25%, 20%, 15%, 10%, 8%, 7%, 6%, 5%, 4%, 3%, 2%, 1% of the optical element. The light source may be positioned within about 0.1 inches, 0.3 inches, 0.5 inches, 0.6 inches, 0.7 inches, 0.8 inches, 0.9 inches, 1 inch, 1.2 inches, 1.5 inches, 1.7 inches, 2 inches, 2.5 inches, 3 inches, 2.5 inches, or 4 inches from the top of the optical element. In some instances, some distance may be provided between the light source and the bottom of the optical element. For example, the light source may be located at least about 0.1 inches, 0.5 inches, 1 inch, 1.5 inches, 2 inches, 2.5 inches, 3 inches, 3.5 inches, 4 inches, 5 inches, or 6 inches from the bottom of the optical element.

The optical element may be configured to cause light to be directed in a particular direction. For example, the optical element may provide a narrow range of illumination or a wide range of illumination. The optical element may cause the light to be emitted at any angle, including those described elsewhere herein. The light may be directed in a symmetrical or asymmetrical manner.

Figure 5B:
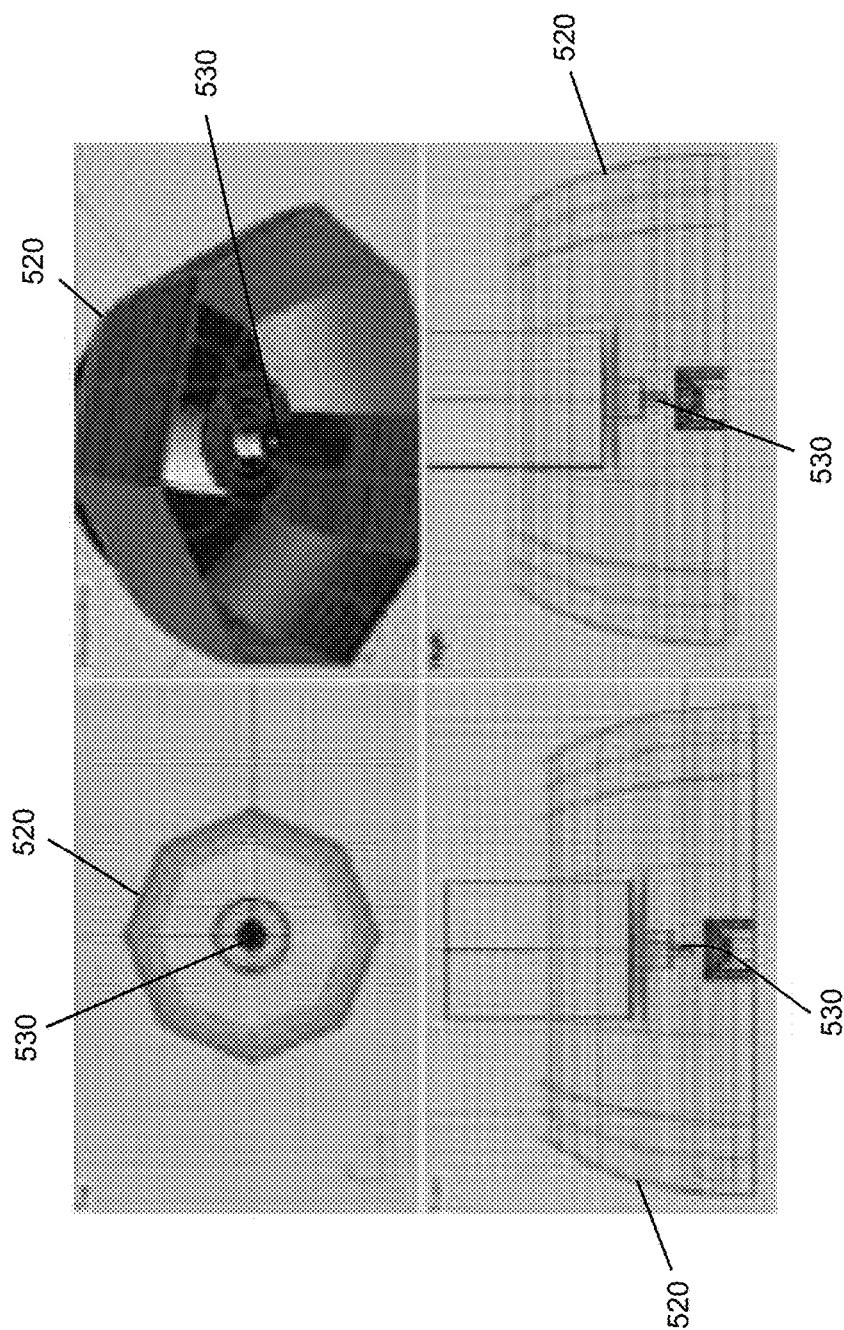

FIG. 5B shows an additional of an optical element 520 that may be provided for the lighting unit. The optical element may be a reflector. A light source 530 may be located within the optical element. The optical element may partially or completely surround the light source.

Figure 5C:
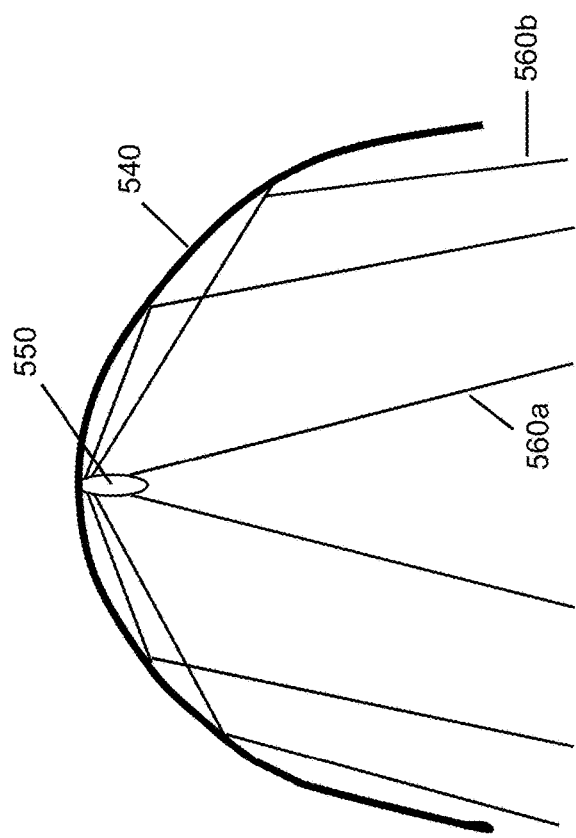

FIG. 5C provides a possible schematic of an optical element 540 used in a lighting unit. A light source 550 may be located at or near the top of the optical element. Light emitted by the light source 560a may directly travel in a direction of illumination, or may be reflected 560b from the optical element and may travel in a direction of illumination. The light source may be located at or near a top portion of the optical element. In some embodiments, light emitted by the light source may be directed primarily downward or in the direction of illumination. In some instances, not much light is directed upwards toward the optical element. In some instances, less than about 30%, 20%, 15%, 10%, 8%, 7%, 6%, 5%, 4%, 3%, 2%, 1%, 0.5%, or 0.1% of the light emitted by the light source may be directed upwards toward an optical element.

In some instances, the direction of the illumination may be toward a surface. In some instances, the direction of illumination may be downward, angled to the side, to the side, angled upward, or directly upward.

The optical element may be shaped to provide a desired pattern of illumination. The light may or may not reach a surface. A desired pattern of illumination may be provided to the surface. Characteristics of a desired pattern of illumination may include the shape of the illuminated area, the light intensity distribution over the illuminated area, and/or the wavelength of light provided at the illuminated area.

In some instances the optical element may be shaped to provide a desired pattern of illumination at a desired area of illumination, without causing much extraneous light to reach outside the desired area of illumination. The optical element may be shaped to focus the light at a desired area of illumination while minimizing or reducing the amount of light pollution in other directions. For example, the light may be directly primarily downward, and reduce the amount of light provided upwards or sideways.

In some examples, an optical element may be configured to provide a 2 fc average, 4 fc maximum, 1 fc minimum distribution of light. In another example, the optical element may be configured to provide 5 fc average, with a minimum of 3 fc in working areas and 1 fc in non-working areas, with a maximum of 18 fc. The optical element may provide greater than, equal to, and/or less than about 1 fc, 2 fc, 3 fc, 4 fc, 5 fc, 7 fc, 10 fc, 12 fc, 15 fc, 18 fc, 20 fc, or 25 fc. The optical elements may be configured to provide illumination to meet OSHA, or other governmental or private standards. This may occur for conditions, such as a 80-120 foot mounting height for the light fixture, with 225 to 450 foot spacing between poles.

Figure 5E:
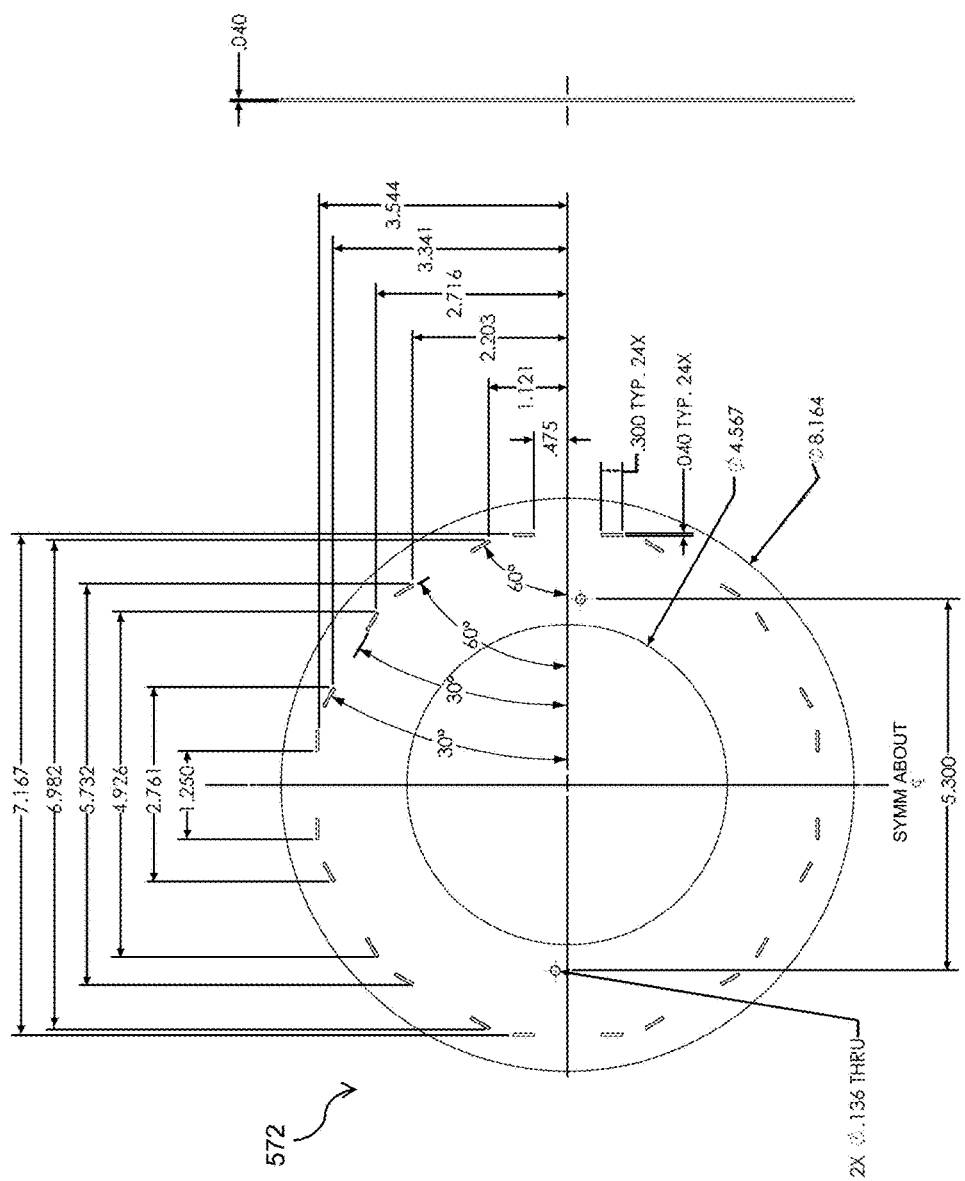
Figure 5G:
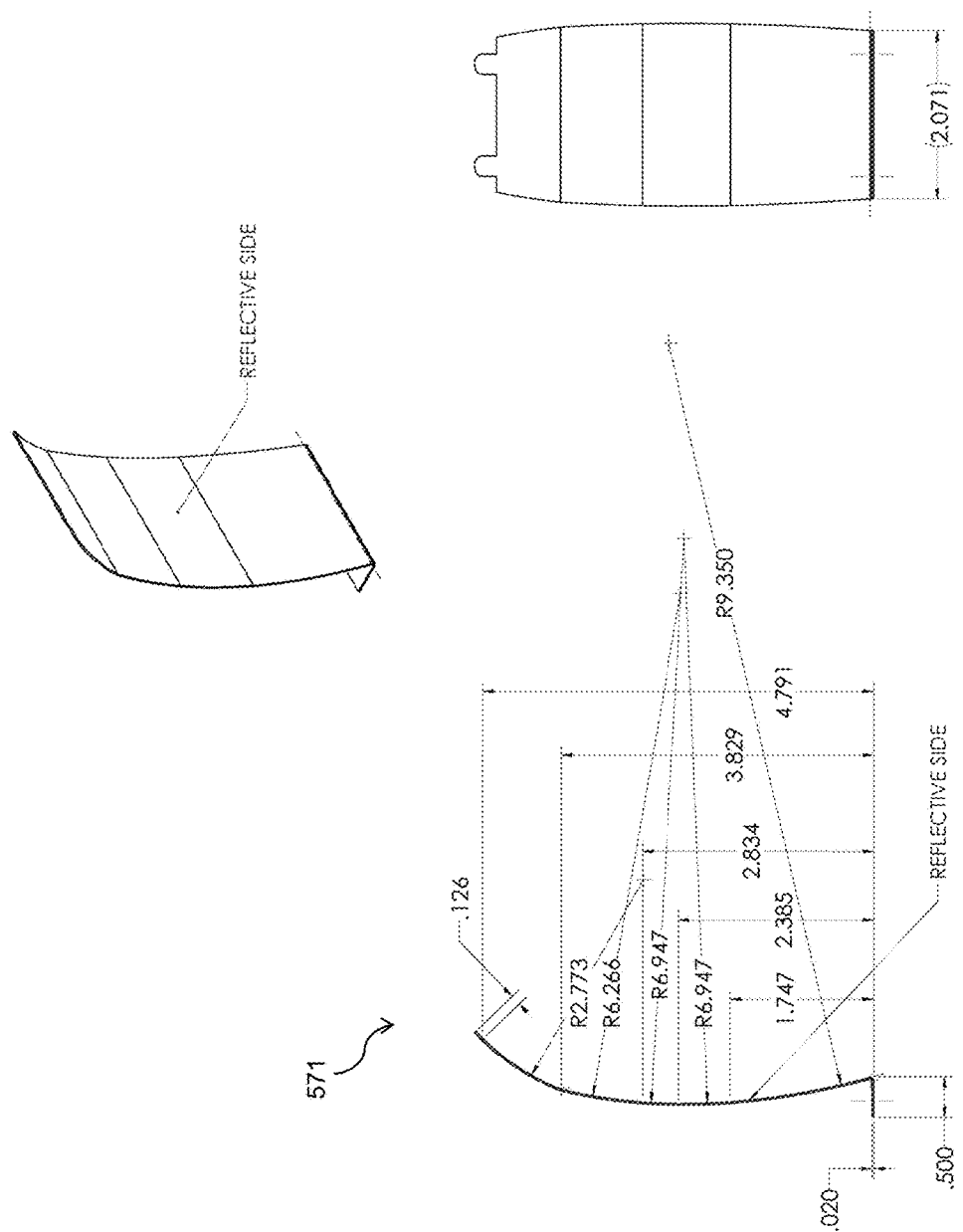

FIG. 5D shows an example of a reflector 500. The reflector may include a main reflector 571, a fling top reflector 572, a fling bottom reflector 573, a reflector cone 574, and a bracket 575 meeting the cone reflector. FIG. 5E is an example of a fling top reflector 572. In some cases, the fling top reflector may be formed from 0.040 inch aluminum. FIG. 5F is an example of a fling bottom reflector 573. In some cases, the fling bottom reflector may be formed from 0.040 inch aluminum. FIG. 5G is an example of a main reflector 571. FIG. 5H is an example of a reflector cone 574. FIG. 5I is an example of a bracket 575 meeting a cone reflector. In some examples, the bracket may be formed from 0.040 inch aluminum. Examples of possible dimensions of the reflectors in the foregoing figures are shown in inches. Lighting units of the disclosure may utilize one or more optics arrangements (e.g., one or more optical elements such as lenses, prisms and/or reflectors, covers and/or combinations thereof). One or more optics may be aimed, combined or arrayed to produce standard IES light distributions. For example, the lighting units may be configured with IES Type II, Type III, Type IV and Type V optical systems. For example, the lighting units may utilize reflectors configured to offer one or more standard light distributions. For example, reflectors of the disclosure may provide Illuminating Engineering Society (IES) Type II, Type III, Type IV and/or Type V light distribution patterns. Standardized light distribution patterns may provide specific guidelines for precise light placement. Any standard or custom light distribution pattern may be provided. In some cases, a light distribution type may include square, round and/or other illumination configuration (e.g., round or square ground illumination patterns). In some cases, light distribution types may have a specific shape. Light distribution types or classifications may specify photometric properties, distance to half maximum candela trace, maximum candela value, lateral light distribution (e.g., lateral light distribution with regard to the lighted area width described as multiples of mounting height, width of half maximum candela trace within a longitudinal distribution range), vertical light distribution (e.g., based on where maximum intensity (candela value) points to on a grid) and/or other luminaire characteristics.

Different light distribution patterns may be suitable for various lighting applications. For example, IES Type II light distributions may be suitable for narrow areas, roadways, and walkways as a result of a asymmetrical wide lateral pattern. In another example, IES Type III light distributions may be suitable for wide roadways, site/area perimeters and open areas (general site lighting) as a result of an asymmetrical pattern which produces both lateral and forward light throw. In a further example, IES Type IV light distributions may be suitable for perimeters where a deep forward throw is required as a result of a forward throw light pattern that can be equipped with house-side shields for maximum lighting control. In yet another example, IES Type V light distributions (e.g., square of round) may be suitable for large open area illumination (e.g., ports) as a result of being designed for lighting from the center out. Various light distribution patterns may be associated with a particular pole or mast spacing. For example, high mast lighting of the disclosure may be configured with IES Type V (also "Type V" herein) optic. One or more high mast lighting units may be spaced apart (e.g., to provide zone lighting) in a manner suitable given the individual light distribution patterns of the one or more lighting units.

A lighting unit may have one or more light sources. In some embodiments, the light sources may be LEP light sources. The LEP light sources may provide a more omnidirectional light stream compared to alternative light sources (e.g., LED light sources) with more pointed light streams. One or more LEP light sources may be combined with one or more IES Type V optics. The LEP light sources of the disclosure may provide light intensities, patterns and/or other illumination characteristics that may be advantageously combined with a Type V optic to enable the lighting systems of the disclosure. For example, an LEP light source may provide a light pattern that is well-suited for providing an IES Type V light distribution, or a similar light distribution pattern (e.g., high mast lighting described herein). In some cases, lower optic configurations (e.g., Type II, Type III, Type IV, or other) may not be suitable for providing high mast lighting using the LEP light sources herein. For example, one or more lower optic configurations may provide a too narrow light distribution for large area high mast lighting systems herein. In some cases, the lower optic configurations may not adequately utilize one or more lighting characteristics of the LEP light sources. Type V optics may include, for example, optical elements such as lenses, prisms and/or reflectors, covers and/or other lighting unit components described elsewhere herein. In some cases, Type V optics may include one or more other optical components.

Lighting units configured with LEP light sources and Type V optics may illuminate an area to a desired or threshold degree of light intensity per area (e.g., expressed in footcandles, i.e., lumens/ft$^2$) as described in more detail elsewhere herein. A lighting unit may illuminate an area with a light intensity greater than or equal to about: 100 lumens, 200 lumens, 500 lumens, 1000 lumens, 2000 lumens, 3000 lumens, 4000 lumens, or 5000 lumens. For example, an LEP light source with Type V optic may illuminate an area with a light intensity of about 4000 lumens. The light source may illuminate the ground area with greater than, equal to, and/or less than about 15,000 lumens, 23,000 lumens, 30,000 lumens, or 46,000 lumens.

The lighting units configured with LEP light sources and Type V optics may spread the light intensity and/or light pattern provided by each LEP light source over an angle (e.g., to achieve a desired light distribution). For example, a portion of the radiant intensity and/or luminous intensity (e.g., candela value) from an LEP light source may be spread over an angle, wherein the portion may be less than, greater than or equal to about: 5%, 10%, 20%, 30%, 40%, 50%, 60%, 70%, 80%, 90%, or 100%. The radiant intensity and/or luminous intensity may be spread over an angle. The angle may be defined with respect to an axis of symmetry in the direction of illumination. Alternatively, the angle may be defined as an angle between two directions at different angles with respect to the axis of symmetry. For example, for a lighting unit with axially symmetric illumination, the radiant intensity and/or luminous intensity from an LEP light source may be spread over a two-dimensional angle of less than, greater than or equal to about: 1°, 5°, 10°, 15°, 20°, 30°, 45°, 60°, 90°, 125°, or 180° in a side view of the lighting unit. In some cases, the radiant flux or luminous flux (e.g., lumen value) may be uniformly distributed in the direction of illumination over the spreading angle. Alternatively, the radiant flux and/or luminous flux may be distributed unevenly (e.g., in accordance with a desired light distribution or illumination pattern). For example, 80% of the radiant intensity and/or luminous intensity from an LEP light source may be spread over an angle of less than about 10° with respect to an axis of symmetry in the direction of illumination, 15% may be spread over an angle of greater than about 10° but less about 15° with respect to an axis of symmetry in the direction of illumination, and 5% may be spread over an angle of greater than about 15° with respect to an axis of symmetry in the direction of illumination. More generally, the radiant intensity and/or luminous intensity from an LEP light source may be spread over a three-dimensional angle of less than, greater than or equal to about: $\pi/10$, $\pi/9$, $\pi/8$, $\pi/7$, $\pi/6$, $\pi/5$, $\pi/4$, $\pi/3$, $\pi/2$, $\pi$, $1.2\pi$, $1.4\pi$, $1.6\pi$, $1.8\pi$, or $2\pi$ steradians. In some cases, a portion of light may be spread over an angle of up to $4\pi$ steradians.

Figure 6:
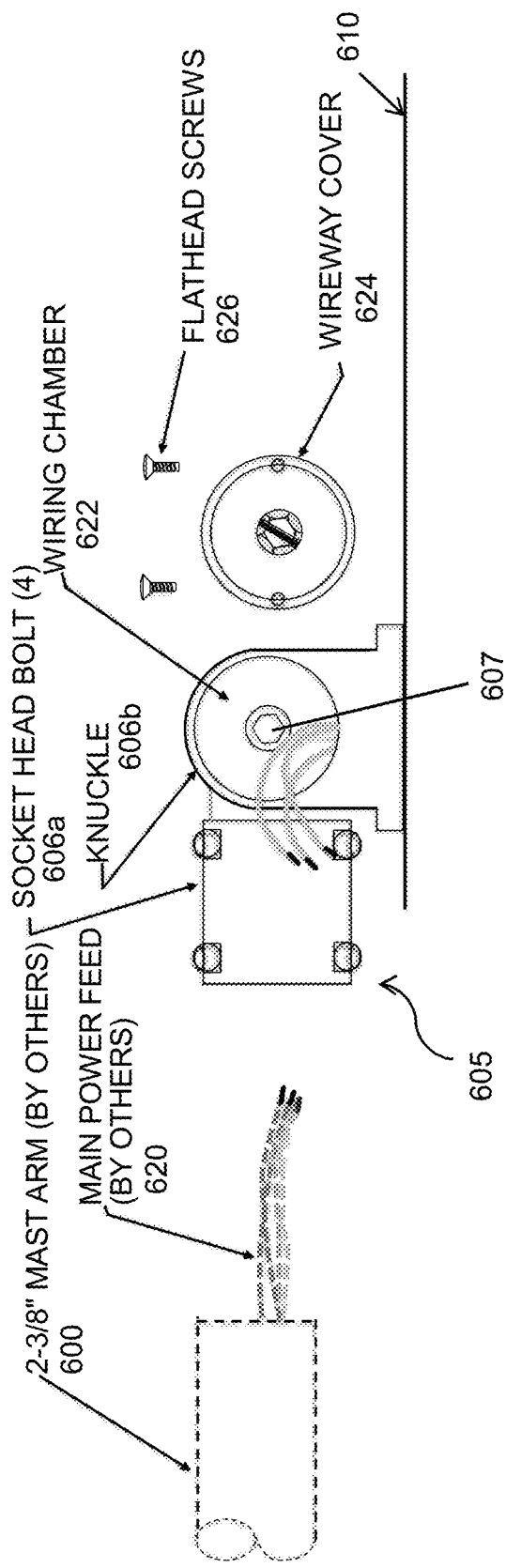
FIG. 6 shows an example of a retro-fit connection of a lighting fixture to a support.

FIG. 6 shows an example of a retro-fit connection of a lighting fixture 610 to a support 600. Alternatively, such a connection may be used for a new support which need not be a retro-fit. A connection interface 605 may be used to connect the lighting fixture to the support. In some instances, the support may be a pre-existing structure. For example, the support may be a pre-existing pole, mast, tower, or any other support described elsewhere herein. The pre-existing support may have been used for other types of lighting units, or for other purposes. The support may be retro-fitted to support a lighting fixture as described herein. The retro-fit may occur via the connection interface.

In some instances, the connection interface 605 may include a socket head bolt 606a and a knuckle 606b. The knuckle may be connected to the lighting fixture. For example, the knuckle may be affixed to a housing of the lighting fixture. The knuckle may be connected to the lighting fixture in any manner, including mechanical fasteners, adhesives, soldering, welding, or any other connection mechanisms described elsewhere herein.

The socket head bolt 606a may be connected to the knuckle 606b. The socket head bolt may have a fixed position relative to the knuckle. Alternatively, the socket head bolt may be movable relative to the knuckle. In one example, a pivot 607 may be provided. The pivot may permit the socket head to rotate about the pivot point with respect to the knuckle. The socket head bolt and knuckle may be arranged at various angles with respect to one another. For example, the socket head bolt and the knuckle may be orthogonal to one another. In some instances, they may be arranged at any angle from 0 to 180 at a continuous spectrum. In other embodiments, they may be arranged at any angle from 0 to 180 at discrete angles along the spectrum. In some instances a single pivot is provided, permitting rotation about a single axis of rotation. Alternatively, two or more pivots may be provided, which may permit rotation about two or more axes of rotation. In some instances, a ball and socket joint may be provided, which may permit rotation in multiple directions.

The socket head bolt 606a may connect to the support 600. In some instances, the socket head bolt may be adjustable to accept various configurations or sizes of the support. For example, if the support is an extended shape, such as a cylinder or prism, the socket head bolt may have one or more adjustable features that may accept a variety of sizes and/or shapes. Alternatively, the socket head bolt may be selected to fit a particular support size and/or shape.

A support 600 may include a main power feed 620. The main power feed may provide power from a power source. The power source may be a utility, energy storage system (e.g., battery or ultracapacitor), or energy generation system (e.g., such as a renewable energy generation system such as a photovoltaic system, wind generation system, geothermal system, hydroelectric system). The power source may be provided with the pre-existing support.

The knuckle 606b may include a wiring chamber 622 which may be capable of receiving the main power feed 620. For example, the main power feed may be provided as one or more wires. The one or more wires may go into the wiring chamber. In some instances, a wireway cover 624 may be provided for the wiring chamber. The wireway cover may prevent the interior of the wiring chamber from being exposed. The wireway cover may prevent the wiring within the wiring chamber from being exposed. The wireway cover may be connected to the wiring chamber via one or more fastener, such as flathead screws 626 or any other fastening mechanism.

The lighting fixture 610 may be mechanically and electrically connected to the support 600. The mechanical connection may be provided via the socket head bolt 606a and the knuckle 606b. The electrical connection may be provided via the main power feed 620 which may be housed in portions of the connection interface 605. The main power feed may be electrically connected to one or more internal components of the lighting fixture. For example, the main power feed may be electrically connected to the driver, light source, controller, communication unit, and/or any other components of the lighting fixture.

The support 600 may be retro-fitted with the lighting fixture 610 as described. In some instances, the connection interface 605 may already be connected to the lighting fixture when the socket is connected to the support. For instance, the knuckle 606b may already be connected to the lighting fixture. Alternatively, the connection interface may be connected to the support prior to being connected to the lighting fixture. For example, the socket head bolt 606a may be connected to the support before the knuckle is connected to the lighting fixture.

Figure 7:
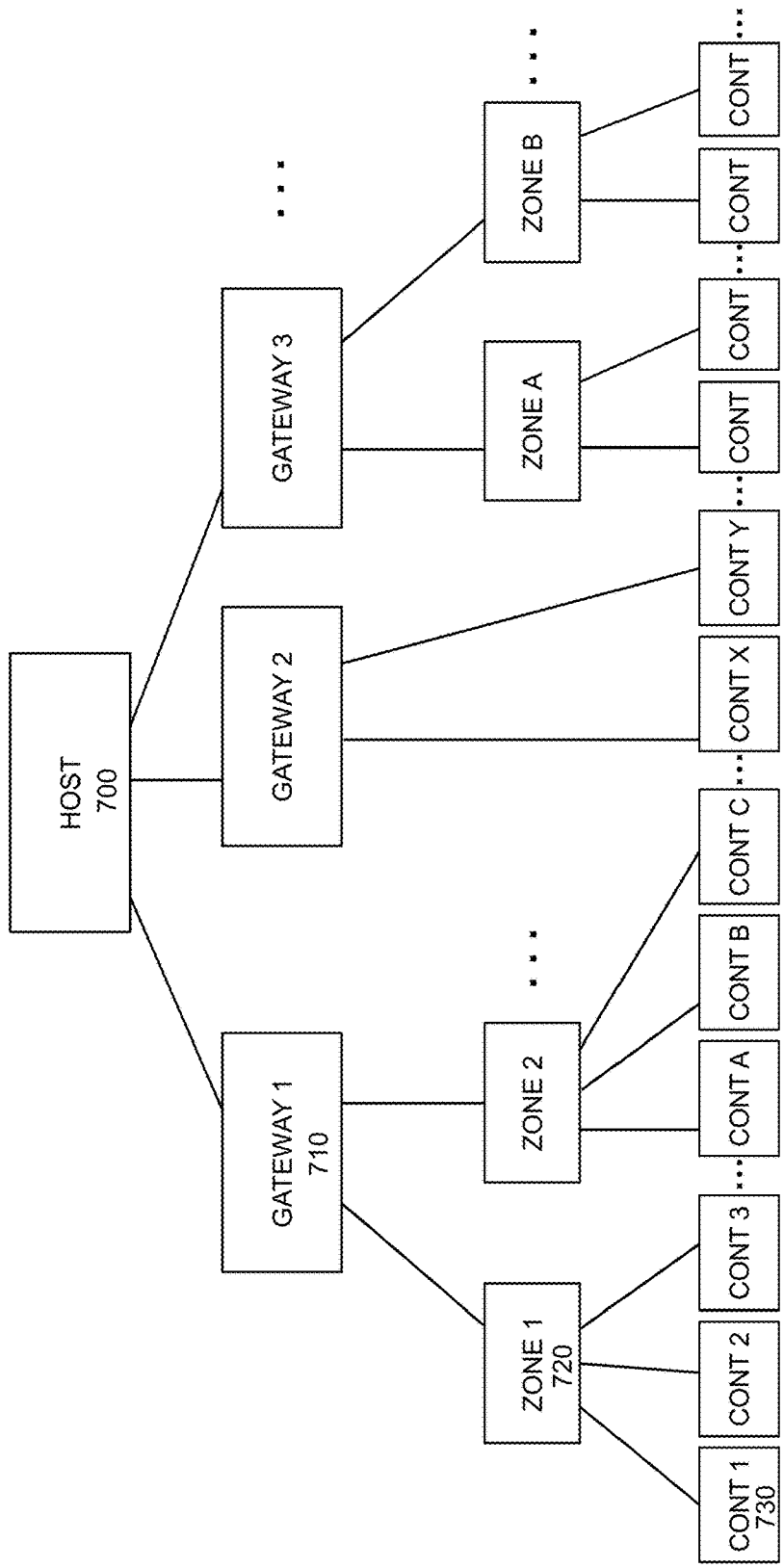
FIG. 7 shows an example of a control hierarchy in accordance with an embodiment of the invention.

FIG. 7 shows an example of a control hierarchy in accordance with an embodiment of the invention. One or more host 700 may be provided in accordance with an embodiment of the invention. The host may be used to manage a lighting system. The host may communicate with one or more gateways 710. A gateway may link one or more lights to the host. In some instances, a gateway may control one or more zone 720. In some instances, one or more controller 730 which may be mounted to one or more light fixture may be provided. One or more controller may be provided in a zone. The gateway may communicate with one or more controller directly without concern for zones, or the controllers may be organized into zones.

The host 700 may receive one or more sensor reading. The sensors may be provided as part of a lighting unit or may be provided separately from the lighting units. For example, one or more sensor may be provided at a location to be illuminated by a lighting unit, to determine the level of light intensity provided at the area. The sensors may include information about the energy consumed by one or more lighting unit, characteristics of light provided by the lighting unit, temperature of the lighting unit, errors detected, and/or light-life information. This information may be sent to the host via a communication unit of a lighting unit. In some instances, information may be sent directly from a sensor without going through a lighting unit communication unit.

The host may use collected data to assist with managing the lighting system. In some instances, a user may input one or more desired parameter for one or more zone, or one or more lighting units. As previously described, a host may permit individual lights to be grouped together into virtual zones. The zones may be independently controllable. Individual lights within a zone may or may not be independently controllable. Zones may be used with strategies to decrease energy usage and increase safety.

Data may be used along with standard or custom control applications, which may optimize or improve energy usage and safety. On demand status and maintenance reports, which may be viewed locally or remotely, can be generated. Energy data management reports may be provided, which may look at total energy usage per lighting unit, per zone, or for an entire network. The energy data management reports may provide such information within a selected time window. For example, the energy data management report may look at energy usage from a particular date or time to another particular date or time. Energy data management reports may also look at illumination provided on a per lighting unit, zone, or entire network basis. Energy efficiency for one or more lighting unit and/or zone may be calculated. The energy data management report may also show the illumination provided at a desired illumination area. In some instances, the energy data management report may also show the illumination provided at undesired areas (e.g., light pollution).

The host may be provided on a device, such as a server, personal computer, laptop computer, tablet, mobile device (e.g., smartphone, cell phone, personal digital assistant), or any other networked device. The host may have one or more processor and a memory. The memory may store data and/or non-transitory computer readable media, which may include code, logic, or instructions for performing one or more step. For example, the tangible computer readable media may include instructions for performing a calculation and/or determination as provided herein, or generating a report as provided herein. A processor may be used to carry out one or more step as described herein. A host may be accessed by a user via a device, such as a device described herein. The host may be provided on a cloud-computing type infrastructure. One or more processing component for the host and/or memory for the host may be distributed over a cloud-computing infrastructure.

The host 700 may communicate with one or more gateways 710. In some instances, the host may communicate with multiple gateways, such as two or more, three or more, four or more, five or more, ten or more, 15 or more, 20 or more, 30 or more, 40 or more, 50 or more, 100 or more, 150 or more, 200 or more, 300 or more, or 500 or more gateways. The host may communicate with the one or more gateways over a network, such as any type of network described elsewhere herein. The host may communicate directly with one, two or more gateways. The host may communicate with the gateways wirelessly or over a wired connection. Any communications at any of the levels described herein, or between any devices may be wireless or wired. Any communications may be directly between devices, through peer-to-peer arrangements, via one or more additional devices, over a network, or using a cloud-computing infrastructure.

In some embodiments, each gateway 710 may link a plurality of lights to the host 700, providing a backhaul Ethernet link. Any number of lights may be connected via a gateway. In one example, up to 10 lights, 50 lights, 100 lights, 250 lights, 500 lights, or 1000 lights may be connected per gateway. Multiple gateways can be connected to manage a large number of lights with or without zone configurations. In some instances, multiple gateways can be connected to manage thousands of lights with multiple zone configurations.

One or more controller 730 may be provided per lighting unit. For example, a controller may be mounted on each lighting fixture. The controller may be contained within a housing of the lighting fixture. The controller may permit remote control of on/off/dimming functions while monitoring energy usage of the lighting fixture. In some instances, a plurality of light sources may be provided within the lighting fixture. The controller may permit independent remote control of on/off/dimming functions of each light source in said plurality. In some instances, a plurality of controllers may be provided for said independent dimming of each light source (e.g., one per light source, or per multiple light sources). Such remote control may be generated automatically based on one or more parameters, or may be inputted by a user. In one example, a communication unit of a lighting unit may receive a wireless signal, which may be sent to the controller, which may provide one or more instructions to a driver to turn on, turn off, dim, or brighten one or more light sources of the lighting fixture. Such communication with the controller may be provided via a communication unit of the lighting unit, which may permit wired or wireless communications via the gateway.

One or more light source may be individually addressable and/or controllable. The light sources may be controlled independently of one another. In some instances, each light source may be independently controlled and/or groups of light sources may be controlled together independently of other groups.

The controller may permit monitoring of the lighting unit. The controller may monitor watts, KWHrs and lifetime usage stats for the lighting unit. Such monitoring may occur on a per lighting unit basis, or on a per light source basis. Additionally, diagnostic capabilities may be provided for indicating light failure or inefficiency. Such failure or inefficiency may be determined on a per lighting unit basis or a per light source basis. For example, a controller may determine that a particular light source of a plurality provided in the lighting unit has a potential failure. The alert may be sent via the gateway to the host, which may provide an alert about which particular light source needs to be replaced or checked.

Various examples of a control hierarchy is provided. Any of numbers of levels of control or groupings may be provided. A host 700 may communicate with a gateway (e.g., GATEWAY 1), which may manage a plurality of zones (e.g., ZONE 1, ZONE 2), which may each have a plurality of controllers (e.g., CONT 1, CONT 2, CONT 3, . . . , CONT A, CONT B, CONT C, . . . ) provided with lighting units. In another example, a host 700 may communicate with a gateway (e.g., GATEWAY 2), which may directly communicate with a plurality of controllers (e.g., CONT X, CONT Y, CONT Z, . . . ) provided with lighting units, without regard to any sort of zone.

The host, gateway, and/or controllers may be located at remote locations relative to one another. For example, a controller may communicate with a gateway which may or may not be remote from the controller. The gateway may communicate with the host which may or may not be remote from the gateway. The host and/or controller may or may not be at remote locations relative to one another.

Figure 8:
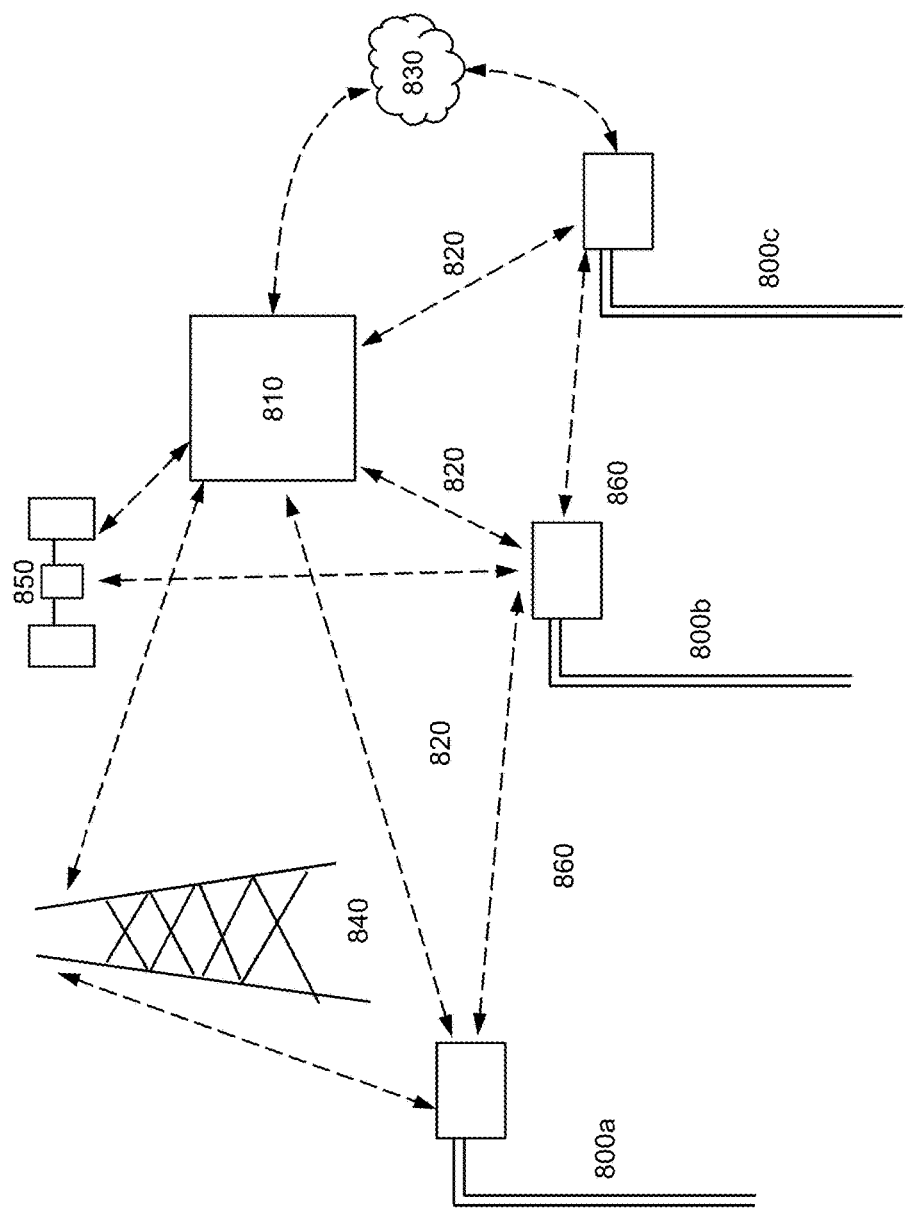
FIG. 8 provides examples of various communication mechanisms between lighting units and controllers.

FIG. 8 provides examples of various communication mechanisms between lighting units and external devices. In one example, a plurality of lighting units 800a, 800b, 800c may be provided. The lighting units may communicate with an external device 810. The external device may be a host, gateway, or another lighting unit. Any description of an external device may refer to a single device, plurality of device, or cloud-computing type infrastructure.

The lighting units may have a communication therein. The communication unit may be capable of sending and/or receiving communications from an external device. The lighting units may communicate with the external device via the communication unit.

In some embodiments, the lighting units may communicate directly 820 with the external device. Such direct communications may occur via receivers and/or transmitters of the lighting units and external device which may permit direct communications. Such communications may occur via any frequency, e.g., radio frequency. Such communications may occur without requiring intervention by other devices and/or networks.

The lighting units may also communicate with the external device via a network 830. Such networks may be local area networks, or wide area networks, such as the Internet. Such networks may be telecommunication networks.

A tower 840 or other structure may aid in the communication of the lighting unit with an external device. Such a structure may receive a signal from a lighting unit and relay the signal to the external device. Similarly, such a structure may receive a signal from the external device and relay the signal to the lighting unit. In some instances, such signals may be relayed via one tower or intermediary structure. Alternatively, they may be relayed via a plurality or series of towers and/or other structures. The tower or other intermediary structures may have receivers and/or transmitters that may permit direct communications with the lighting units, external device, and/or other intermediary structures.

In some instances, communications may be provided via a satellite 850 or other intermediary device. The satellite may receive a signal from a lighting unit and relay the signal to the external device. Similarly, a satellite or other intermediary device may receive a signal from the external device and relay the signal to the lighting unit.

In some instances, the lighting units may be able to communicate directly 860 with one another. Such direct communications may occur via receivers and/or transmitters of the lighting units which may permit direct communications. Such communications may occur via any frequency, e.g., radio frequency. Such communications may occur without requiring intervention by other devices and/or networks. In other examples, the lighting units may communicate with one another via one or more intermediary structure or device, or over a network.

Peer-to-peer communications may be provided between the lighting units. In some instances, peer-to-peer communications may be provided without requiring a centralized host. The functions of the host may be performed by a lighting unit, or by a distributed set of lighting units. The distributed set of lighting units may form a cloud type infrastructure.

In some instances, a master-slave organization may be set up, where a master lighting unit may provide instructions to one or more slave lighting unit. In some instances, the master lighting unit may generate or determine the instructions to the provided to the slave lighting units. The master lighting unit may function as a host. Alternatively, the master lighting units may receive instructions from a host. The master lighting unit may provide instructions to the slave lighting units based on instructions from the host.

One or more, or any combination of communication techniques and/or control techniques described herein may be used.

Lighting communications and/or control of the disclosure may utilize a user interface provided, with the aid of a processor, to one or more users. The user interfaces may allow the user(s) to interact with lighting systems provided herein. For example, one or more communication and/or control steps, responses, statuses, user inputs, system outputs and/or any other indicators (collectively "data" or "lighting system data" herein) of lighting system events may be presented at a user interface. A user interface may be displayed across a network such as the Internet. For example, an implementation may include a client computer comprising a video display with at least one display page comprising the lighting system data and any associated interfacing data (e.g., machine data). In some embodiments, such data may be collected from one or more measurement or sensing devices at one or more lighting units, motion sensors, cameras, beacons or beacon receivers, controllers, user terminals, drivers, communication units and/or any other lighting system components herein (e.g., as described with reference to communications mechanisms of FIG. 8, control hierarchy of FIG. 7, lighting unit components of FIG. 2, etc.). The data may be retrieved/collected manually, collected automatically (e.g., periodically, or near-continuously), or a combination thereof.

In some cases, one or more user interfaces may be graphical user interfaces. The user interface(s) may be displayed on a video display and/or display page. A server and/or client computer may have access to lighting management software. A user interface may be used to display or provide access to lighting system data. For example, a user interface may be provided for a web page or for an application. An application may be accessed remotely or locally. A user interface may be provided for a software program, gadget, widget, tool, plug-in, or any other type of object, application, or software. For example, a user at a client computer may be able to access a display page for a lighting system management software program. The lighting system management software may provide functionality for monitoring, reporting, controlling and/or interacting with a lighting system.

A display page may comprise well known features of graphical user interface technology, such as, for example, frames, windows, tabs, scroll bars, buttons, icons, menus, fields, and hyperlinks, and well known features such as a "point and click" interface. Pointing to and clicking on a graphical user interface button, icon, menu option, or hyperlink also is known as "selecting" the button, icon, option, or hyperlink. Additionally, a "point and gesture" interface may be utilized, such as a hand-gesture driven interface. Furthermore, a touchscreen interface may be utilized, where touching a visual object may constitute selecting the object. Any other interface for interacting with a graphical user interface may be utilized. A display page according to the invention also may incorporate multimedia features. User interfaces and/or communications/controls provided herein may be implemented using one or more computer systems (e.g., client computer). The computer system system(s) may include a memory location, a communications interface, a display interface and, in some cases, a data storage unit, which are all operatively coupled to a processor, such as a central processing unit (CPU). The memory location may include one or more of flash memory, cache and a hard disk. In some situations the memory location may be read-only memory (ROM) or random-access memory (RAM), to name a few examples.

The computer system(s) may be embodied in programming. Various aspects of the technology may be thought of as "products" or "articles of manufacture" typically in the form of machine (or processor) executable code and/or associated data that is carried on or embodied in a type of machine readable medium. Machine-executable (also "computer-executable" herein) code may be stored on an electronic storage unit, such as one or more memory (e.g., ROM, RAM) or one or more hard disks. Examples of hard disks may include magnetic and solid state recording media. "Storage" type media may include any or all of the tangible memory of computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air links. The physical elements that carry such waves, such as wired or wireless links, optical links or the like, also may be considered as media bearing the software. As used herein, unless restricted to non-transitory, tangible "storage" media, terms such as computer or machine "readable medium" may refer to any medium that participates in providing instructions to a processor for execution.

Figure 9:
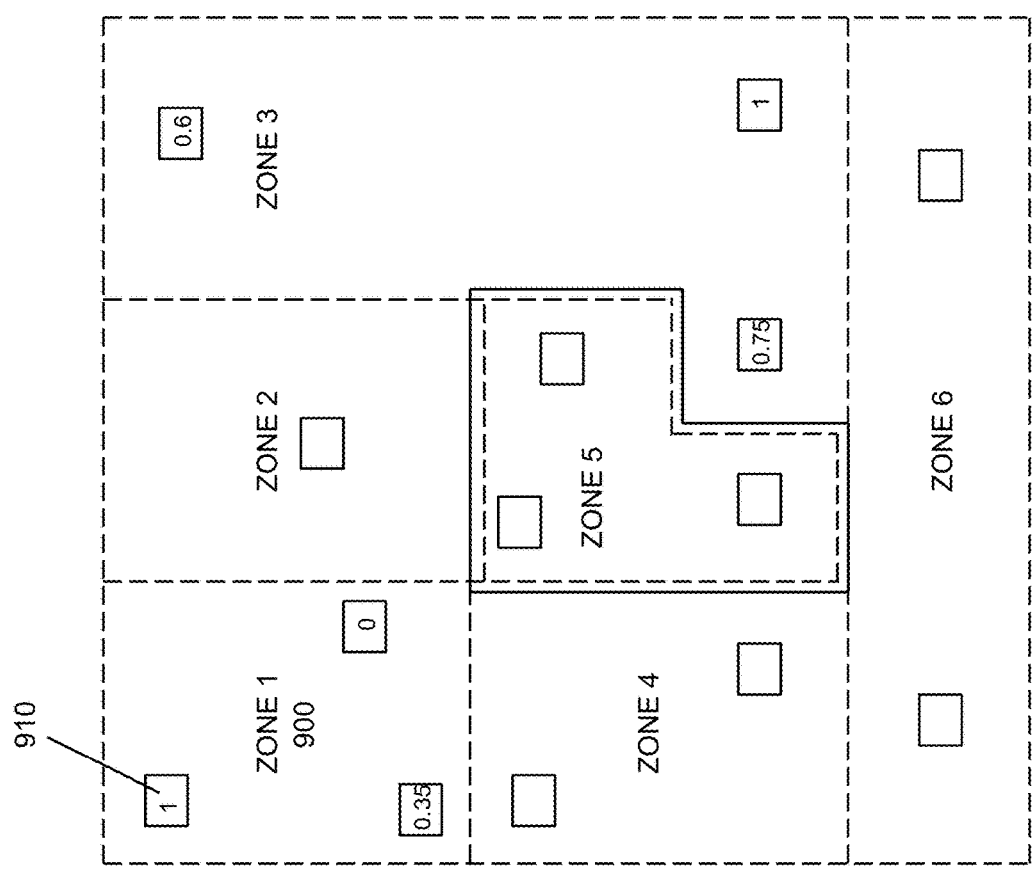
FIG. 9 provides an example of lighting control zones in accordance with an embodiment of the invention.

FIG. 9 provides an example of lighting control zones in accordance with an embodiment of the invention. The zones may cover various geographic locations or areas. For example, a geographic area may be divided into one or more zones. The zones may have the same size (e.g., area) and/or shape. Alternatively, the size and/or shape of the zones may vary. The zones may have the same number of lighting units therein. Alternatively, the zones may have different numbers or distributions of lighting units.

In some instances, the zones may form a grid pattern and/or array. Alternatively, the zones may include irregular shapes. The zones may fit together like puzzle pieces. In some instances, zones may be determined based on geographic landmarks or features. For example, a zone may have a border where there is a ridge or mountain. A zone may have a border defined by one or more natural or man-made structure. For example, the interior of a building (e.g., Zone 5) may be a zone. A zone may also be determined based on usage. For example, a portion of land that may require certain light characteristics may form a zone, while an adjacent portion of land which has different light characteristics may form another zone. In one example, a parking lot may be adjacent to an unused field. In some instances, it may be desirable to keep the parking lot more well-lit than the field. In some instances, zones may overlap on a map. For example, a multi-floor structure may be provided. Each floor of the structure may be its own zone. Alternatively, the entire structure may belong to a single zone.

Lighting units 910 may be located anywhere in a zone 900. In some embodiments, the lighting units may be high-mast lighting units. The lighting units may utilize light emitting plasma light sources, or any other light sources described elsewhere herein.

The lighting units may be distributed in any manner to provide a desired pattern of illumination. In some instances, the lighting units may be provided in rows, columns, and/or arrays. The number and/or distribution of lighting units may be selected per zone to provide a desired degree (e.g., intensity) and/or pattern of illumination. Some zones may require brighter light than other zones. Some zones may require greater illumination at different times than other zones.

The lighting units may be at any distance from one another. In some instances, providing lighting units capable of providing a greater degree and/or area of illumination may require fewer poles per area. In some instances, the lighting units may be spaced apart to any density. For example, the lighting units may be n times the support height from each other, where n is a whole number (e.g., 1, 2, 3, 4, 5, 6, or more). For example, the lighting units may be 3 times a pole height from one another. If a lighting unit is mounted on a 100 foot pole, the lighting units may be about 300 feet from one another.

In some instances, the lighting units are distributed in a zone so that there is not much variation in between the brightest and darkest areas of the zone. For example, the maximum variation between brightest and darkest may be about 10:1, 8:1, 6:1, 5:1, 4:1, 3:1, 2:1, 1.5:1, or about 1.1:1.

Lighting within each zone may be independently controlled. For example lighting units within each zone may be controlled together to provide a desired degree of illumination based on a desired schedule. For example, at a warehouse, a certain degree of brightness may be desired during hours at which people will likely be around the warehouse or performing functions at the warehouse. A lesser degree of brightness may be desired during off-hours when nobody is supposed to be around the warehouse, or the functions that are performed do not require as high a brightness. According to such schedules, the lights of the lighting units may be turned on, turned off, dimmed or brightened correspondingly. In some embodiments, each of the lighting units within the zone may be controlled according to the same schedule. For example, they may all be dimmed the same amount at the same time. The lighting units within the same zone may not be controlled independently.

In other examples, each of the lighting units within the same zone may be independently controlled. For example, an illumination schedule may note that at a particular time, one part of the zone may require greater illumination, while at another time, another part of the zone may require greater illumination. The lighting units within the zone may be controlled to provide the desired degrees of illuminations to the various parts of the zones in accordance with the illumination schedule. For example, at Zone 3, a lighting unit may be provided at a north end of the zone, while two lighting units may be provided at a south end of the zone. According to an illumination schedule, the light at the north end may be turned off at midnight, while the two southern lighting units are dimmed to 50%. Then at 3 am, the light at the north end may be turned on to 70% if there is anticipated activity at the northern end at that time, and the two southern lights may be dimmed further to 20%. At 5 am, if all areas are expected to have full activity, all three lights may be turned on to 100%.

One or more lighting unit may be controlled to compensate for another lighting unit within the same zone to provide a desired degree of illumination. For example, it may be desired for a zone to have an overall degree of illumination. However, certain greater intensities of light may be desired at various portions of the zones at different times. The individual lighting units within the zone may be dimmed and brightened correspondingly.

In another example, an error may be detected at one or more lighting unit with a zone. If the error is detected, the lighting unit may be turned off. Other surrounding lights may be turned on or brightened in order to compensate for the off light.

Such controls may be provided in accordance with a pre-determined illumination schedule. The illumination schedule may be predetermined by the host according to one or more standard or customized parameters. The illumination schedule may be manually determined by a user of the system. For example, an operator of a warehouse may interact with a user interface of the host, and determine that they want certain lights on, off, or at a certain dimmed value at various times. The schedule may be determined on a daily basis, weekly basis (e.g., certain schedules may apply to Wednesdays, and certain different schedules may apply to Fridays), monthly basis, or seasonal basis (e.g., more light may be required earlier in the winter, when it becomes darker faster). The schedules may be altered as needed.

In some instances, a pre-determined illumination schedule may be generated based on energy usage and/or cost savings. For example, certain peak hours may have a greater cost of electricity. If not much illumination is needed at those times, the lights may be dimmed. The lights may be brightened when electricity is cheaper. The lights may be dimmed and/or brightened also in accordance with illumination need.

A pre-determined illumination schedule may be action-driven. For example, the pre-determined illumination schedule may tell the lighting units to operate in a specific manner at a specific time (e.g., be on/off at specific times, or dimmed to certain levels at certain times). Regardless of the outcome (e.g., how bright or the light distribution pattern), the lighting units may operate as directed. Sensors or measurements may not be required in order for the action-driven schedule. Sensors may optionally be provided to provide confirmation that the lighting units are operating properly.

In some instances, such illumination schedules may not be predetermined but may be generated on the fly in response to one or more sensed condition. For example, one or more standardized or customized parameters may be provided (e.g., having a particular area at a desired brightness). One or more sensor may be provided to determine if the parameters are being met, and lighting units may be adjusted accordingly. For example, one or more light sensors may be provided at an area to determine the intensity of light at that area. If the area is too dimmed, the surrounding lighting units may be brightened accordingly. If the area is overly bright, the surrounding lighting units may be dimmed or turned off. This may allow the lighting units to compensate for weather or daily conditions. For example, if throughout the year, it is desired to keep a particular area lit to a certain degree until 7 pm, the amount of assistance for lighting the area from the lighting units may depend on when the sun goes down.

One or more calculations/rules may be provided that may accept one or more sensed condition and one or more desired parameter. The signals to be provided to the lighting units and/or control illumination by the lighting units may be generated by said calculations/rules.

The on-the-fly illumination schemes may be results-driven. For example, the on-the-fly illumination schemes may cause the lighting units to operate in a manner to achieve a particular result (e.g., desired illumination pattern and/or degree, desired energy usage, desired energy cost thresholds). One or more sensed conditions or measure conditions may be required to provide feedback to the system in order to achieve the desired result.

A host may provide a pre-determined illumination schedule and/or the on-the-fly illumination scheme. The host may receive information from one or more lighting unit and/or additional sensors. The host may provide instructions to the one or more lighting units. Such instructions may be provided on a zone by zone basis, or on an individualized lighting units basis. Such instructions or may or may not be individualized to the level of each light source within the lighting units. The lighting units may turn on, turn off, dim, brighten, or maintain the light sources within the lighting units in accordance with the instructions.

In some embodiments, lighting units of the disclosure may be used to illuminate ports and/or harbors. Vessels (e.g., cargo ships, tankers, cruise ships or any other water-borne vessels) may be moored in designated locations (also referred to as "berths" in ports and harbors), for example for the purposes of loading, unloading, servicing, fueling and/or other purposes. The berths may be designated by the management of a facility (e.g., port authority, harbor master). The vessels may be assigned to the berths by these authorities. The berths may be located alongside a quay or a jetty in large ports, or a floating dock in small harbors and marinas. The berths may be general or specific to the types of vessels that use them. The size of the berths may vary, for example, from about 5 to 10 m for a small boat in a marina to larger than about 400 m for a tanker. A port and/or harbor may contain any number of berths. For example, a port/harbor may contain less than 5, less than 15, less than 30, less than 50, less than 100, more than 100, more than 200, more than 500, or more than 1000 berths. The number of berths may be depend on the size of vessels moored in the port/harbor.

A port may comprise one or more zones, which may or may not be illuminated. Each zone may include one or more berths. For example, each zone may correspond to a berth, or to multiple berths. Alternatively, each berth may include multiple zones. For example, a berth may include 1, 2, 3, 4, 5, 10, 15 or more zones (e.g., a large ship may need illumination in multiple locations and/or from multiple directions, which may define zones, including along the sides of the ship, near the water surface, at the bow, at the stern, on the deck etc.). Any description of ports herein may also be applied to harbors. A zone (e.g., zone 900 in FIG. 9) may include any number of lighting units, as described elsewhere herein. Each lighting units may illuminate a berth, a portion of a berth, a zone, a portion of a zone, or any other part of the port. For example, a zone may include a plurality of lighting units 910, wherein each lighting unit may illuminate a berth. In another example, more than one of the plurality of lighting units 910 may illuminate a berth. In yet another example, one or more of the plurality of lighting units may illuminate a portion of a berth or any other part of the port, Alternatively, the lighting units may illuminate one or more berths or portions thereof, or any other part of the port without being organized in zones.

The area illuminated by each lighting unit or lighting fixture 910 may have a dimension with illuminated area d or any other area, as described in greater detail elsewhere herein. In some cases, the area illuminated by one or more lighting units or lighting fixtures may correspond to a berth, a portion of a berth, a zone, a portion of a zone, or any other part of the port.

The lighting units may be organized in lighting control zones described, for example, with reference to FIG. 9. The lighting control zones may or may not correspond to berths and/or specific parts of the port. One or more dimensions of a lighting control zone may be a fraction or a multiple of an illuminated area dimension d. For example, a zone may be a couple of football fields wide or long, and may include any number of lighting units. For instance, a length, width, diagonal, and/or circumference of a zone may be greater than or equal to 50 meters, 75 meters, 100 meters, 125 meters, 150 meters, 200 meters, 250 meters, 300 meters, 400 meters, 500 meters, 700 meters, or 1000 meters. The lighting units may each illuminate an area with dimension d as described elsewhere herein, and may be distributed in the zone such that the illuminated areas are adjacent to each other without overlapping, such that the illuminated areas overlap and/or a combination thereof. The lighting units may be independently controlled. For example, the lighting units may turned on (e.g., value of 1), off (e.g., value 0), or set to any dimmed setting in a continuous or discrete range between 0 and 1. This is shown, for example, in zones 1 and 3 in FIG. 9, where some of the lighting units 910 are on (indicated by 1), some are off (indicated by 0), and some are dimmed (indicated by, for example, 0.35, 0.6 and 0.75).

Adequate port illumination may be an important security measure, such as, for example, for homeland security considerations. Furthermore, controlled illumination is an important factor in energy efficiency. In some embodiments, one or more sensors may be provided as described elsewhere herein. The sensors may include, but are not limited to, photosensors determining the intensity of light provided by one or more lighting units, motion sensors, beacons or receivers of beacon signals (also "beacon receivers" herein) and/or other sensors. Furthermore, sensors may include or be in communication with one or more cameras or a camera network. The sensors may communicate, control and/or be controlled by lighting units or components thereof through any communication means described herein (e.g., via communication means described with reference to FIGS. 7-9). For example, the sensors, lighting units or lighting/monitoring system components may communicate over a network. The sensors and sensor communications of the disclosure may enable various port lighting configurations and responses.

Sensors may include motion sensors, which may respond to motion in a predetermined zone, part of a zone, lighting area and/or any other part or section of a port. The motion sensors may enable lighting to be turned on and off as needed in response to motion a sensed area. One or more lighting units, zones or any other lighting areas herein may be monitored by one or more motion sensors. When no motion is detected by the motion sensors, a lighting configuration may include a default lighting configuration (e.g., lighting off, low intensity lighting, night lights, or any other predetermined configuration of dimmable lighting units). When motion is detected by the motion sensors, a lighting configuration may include turning on one or more lighting units, which may be organized in zones, to illuminated the lighting area where motion was detected and/or nearby lighting areas. In one example, a port may have limited or no illumination (e.g., the quay, jetty or dock may be illuminated by night lighting, ground lighting such as red ground lighting, limited or dimmed high mast lighting, no lighting), and high mast lighting may be triggered in areas where motion is sensed (e.g., motion along the quay along the side of the ship may cause the side of the ship to be illuminated, and may also cause one or more other parts of the ship or other lighting zones to be illuminated, including the entire ship, nearby ship, multiple zones of the port, the whole port etc.).

The motion sensors may be organized in a motion sensor network. The motion sensor network may communicate with one or more lighting units of the disclosure, and/or with a camera network. The motion sensor network, the camera network and the lighting unit network may communicate with each other directly and/or by proxy. For example, the camera network may be in communication with the motion sensors, and the motion sensors may be in communication with the lighting units. Alternatively, the camera network may be in communication with the lighting units, and the motion sensors may be in communication with the camera network. In another example, the camera network and the motion sensor network may be in direct communication with the lighting unit network and/or with each other. Examples of communications and responses may include activation of one or more high mast lighting units in response to a signal or signals received from one or more motion sensors, wherein the signal(s) may activate or control one or more cameras to monitor a given lighting area.

In some cases, photosensors or photodetectors of the disclosure may be sensors of light or other electromagnetic energy, and may include, for example, image sensors (e.g., CMOS), charge coupled devices (CCD), chemical detectors (e.g., photographic plates), light emitting diodes (LED) reverse-biased to act as photodiodes, optical detectors (e.g., quantum devices, thermometers), photoresistors or light dependent resistors (LDR), photovoltaic cells or solar cells, photodiodes, photomultiplier tubes, phototubes, phototransistors, quantum dot photoconductors or photodiodes etc. In some cases, the photosensors or photodetectors may include light sensing functionality only. In other cases, the photosensors or photodetectors may include other sensing functionality. For example, a photosensor which detects thermal energy may detect the presence of persons in a similar fashion to a motion detector. In another example, an image sensor may have light sensing capability and may also, or alternatively, record or transmit images of a lighting area similar to a video camera (e.g., a stream of captured images may provide visual or other sensor information similar to a recorded video stream). Thus, cameras and photosensors of the disclosure may have one or more common characteristics. The cameras may include video and/or any other image recording devices and media known in the art. Motion sensors of the disclosure may include, for example, infrared sensors, ultrasonic sensors, microwave sensors, tomographic detectors and/or other types of detectors.

Sensors may include beacons and/or beacon receivers, such as, for example, light or optical beacons, radio beacons, high frequency beacons, space and satellite radio beacons, infrared beacons, sonar beacons, marker beacons and/or other beacon signal types or frequencies. Beacons may be provided on vessels and received by beacon receivers in the port. In some cases, beacons may be provided in the port and received by beacon receivers on the vessels. For example, a beacon signal from a vessel (e.g., a ship) may be received at the port and an appropriate lighting configuration may be adapted in response to the beacon signal. For example, an illuminated pathway may be provided for the vessel to enter the port. The illuminated pathway may guide the vessel to an appropriate berth. The illuminated pathway may be provided through control of one or more lighting units of the disclosure and/or one or more lighting zones. In some cases, dedicated beacons and beacon receivers may used. In some cases, the beacons and beacon receivers may communicate with each other over a network (e.g., satellite network). Beacon communications may include communication/control of beacons and/or beacon receivers in ports by the vessels and/or communication/control of beacons and/or beacon receivers on vessels by the ports. For example, a vessel may be given a choice of multiple berths, and may communicate a selection to the port, wherein a particular illuminated pathway is provided at the port in response. In some cases, vessels and ports may be in electronic communication with each other in addition to beacon communications (e.g., wireless communications). Such communications may or may not complement beacon communications.

Beacon communications may be automatic. For example, a vessel may be provided with a beacon. The beacon may or may not be automatic. If an appropriate sensor or beacon receiver is present in a port, the beacon signal may be picked up automatically. In response to the received signal, high mast lighting of the disclosure may be turned on to guide the way for the vessel entering or navigating the port. The high mast lighting may function as leading lights.

Further, illumination by lighting units herein may be scheduled and/or timed. For example, lighting may be powered up when vessels arrive. Lighting may be provided in response to communications received from the vessel (e.g., the vessel may communicate a delay, and lighting may be scheduled or rescheduled accordingly). Lighting may be timed (e.g., one or more lighting areas may be illuminated automatically at sunset, illuminated pathways and/or motion sensor activated illumination may remain on for a predetermined amount of time before being turned off or returned to a default setting), Thus, lighting may be provided in real-time (e.g., in direct response to vessels arriving at the port), according to one or more schedules and/or according to one or more timers. The lighting may be provided automatically (e.g., without requiring user input), manually (e.g., in response to vessel or port authority input), or a combination thereof. Illumination by lighting units of the disclosure may be automatic, sensor-controlled (e.g., automatic or manual response to beacon signals, motion sensors and other controls), manual, timed and/or otherwise configured (e.g., combinations of the above).

In some instances, lighting may be controlled in communication with memory that may store information about events. For example, an electronic calendar or manifest scheduler may be provided which may include information about the schedules of one or more incidents (e.g., arrivals or departures of ships or other conveyances, expected activity). Based on the schedule, lighting may be timed. For example, if a linked calendar indicates that a ship is scheduled to arrive at midnight at a particular berth, the lighting units in the proximity of the berth may be illuminated a little prior to midnight. Updating the calendar may result in updating the lighting schedule automatically. Lighting may be controlled in accordance with other peripheral information. For example, if a weather report comes in that if a storm is coming in that will likely affect the timing of arrivals or prevent arrivals altogether, the lighting schedule may be automatically adjusted or updated.

One or more characteristics, components, features, and/or steps known in the art may be incorporated and/or used. See, e.g., U.S. Pat. No. 6,676,279; U.S. Patent Publication No. 2010/0315252; U.S. Pat. Nos. 7,246,918; 3,660,650; U.S. Patent Publication No. 2010/0029268; U.S. Patent Publication No. 2011/0121734, which are hereby incorporated by reference in their entirety.

It should be understood from the foregoing that, while particular implementations have been illustrated and described, various modifications can be made thereto and are contemplated herein. It is also not intended that the invention be limited by the specific examples provided within the specification. While the invention has been described with reference to the aforementioned specification, the descriptions and illustrations of the preferable embodiments herein are not meant to be construed in a limiting sense. Furthermore, it shall be understood that all aspects of the invention are not limited to the specific depictions, configurations or relative proportions set forth herein which depend upon a variety of conditions and variables. Various modifications in form and detail of the embodiments of the invention will be apparent to a person skilled in the art. It is therefore contemplated that the invention shall also cover any such modifications, variations and equivalents.

What is claimed is:

1. A high-mast lighting system for illuminating a transportation terminal comprising:
   a plurality of LED lighting units which are organized into predefined illumination zones within the transportation terminal, wherein each of the plurality of LED lighting unit is supported on a pole above a surface within the transportation terminal, and wherein each of the plurality of LED lighting units includes:
      an LED light source;
      an optical element partially surrounding at least the LED light source, wherein the optical element is selected to illuminate each of the predefined illumination zones within the transportation terminal; and
      an individually addressable controller to automatically control brightness level of one or more individual LED lighting units and light beam distribution based at least in part on sensor data; and
         a plurality of sensors configured to collect the sensor data relating to (i) one or more characteristics or parameters relating to at least one of the: LED light source, LED lighting unit, high-mast lighting system, a level of lighting in the environment surrounding the lighting system, a level of lighting in each predefined illumination zone within the transportation terminal, and (ii) variable levels of activity and inactivity over selected time intervals in the predefined illumination zones within the transportation terminal,
      and a host computer in communication with each individually addressable controller over a wireless network within the transportation terminal, wherein the host computer is coupled to a memory having a set of stored set of instructions to control each of the plurality of individually addressable LED lighting units according to a selected illumination schedule and pattern based at least in part on the activity and inactivity over selected time intervals in the illumination zones within the transportation terminal,
   wherein the illumination schedule includes controlling a first group of LED lighting units within the illumination zone to provide illumination during the selected time intervals and a second group of LED lighting units to provide additional illumination according to an anticipated activity within the illumination zone, wherein the illumination schedule can be automatically adjusted or updated.

2. The high-mast lighting system of claim 1, wherein the optical element is controlled by the individually addressable controller to direct light toward a surface within the illumination zones according to an instruction generated based at least in part on the sensor data.

3. The high-mast lighting system of claim 1, wherein the individually addressable controller is provided on at least one of the plurality of LED lighting units.

4. The high-mast lighting system of claim 1, wherein the individually addressable controller is provided for two or more of the plurality of LED lighting units.

5. The high-mast lighting system of claim 3, wherein the individually addressable controller is an integrated wireless controller having a mechanism that enables non-wireless control of the LED lighting unit.

6. The high-mast lighting system of claim 3, wherein the individually addressable controller is an integrated wireless controller having a mechanism that enables wireless control of the LED lighting unit.

7. The high-mast lighting system of claim 1, wherein at least a portion of the sensor data are relayed by a second individually addressable controller disjointed from at least a portion of the plurality of LED lighting units.

8. The high-mast lighting system of claim 7, wherein the sensor data is relayed by the individually addressable controller over a wireless network within the transportation terminal.

9. The high-mast lighting system of claim 1, wherein the sensor data comprises detection one or more of: presence of a vehicle, velocity of a vehicle, and size of a vehicle.

10. The high-mast lighting system of claim 1, wherein the individually addressable controller is bridged utilizing wired or wireless communication within the transportation terminal.

11. The high-mast lighting system of claim 1, wherein the selected time intervals may be a pre-determined illumination schedule based on expected traffic or activity within the transportation terminal.

12. The high-mast lighting system of claim 1, wherein the host computer communicates with one or more gateways, wherein a gateway links one or more LED lighting units to the host computer.

13. The high-mast lighting system of claim 1, wherein the host computer communicates with one or more gateways, wherein a gateway controls one or more illumination zones.

14. The high-mast lighting system of claim 1, wherein one or more lighting characteristics of each LED light source is controlled based on software-generated signals or instructions from the individually addressable controller, hardware-generated signals or instructions from the addressable controller, or a combination of both.

15. The high-mast lighting system of claim 14, wherein the lighting characteristics include brightness level and light beam distribution.

16. The high-mast lighting system of claim 1, wherein the activity includes events that are associated with one or more pre-determined illumination schedule, wherein at least one event is identified at least in part by a signal from a transponder provided with a vessel in communication with the lighting system or by sensor data obtained from sensors separate from the LED lighting units.

17. The high-mast lighting system of claim 16, wherein a duration of lighting is determined according to the pre-determined illumination schedule associated with the events.

18. The high-mast lighting system of claim 1, further comprising a host computer in communication with each individually addressable controller over a wireless network within the transportation terminal, wherein the host computer is coupled to a memory having a set of stored set of instructions to control each of the individually addressable LED lighting units according to an illumination schedule generated on the fly in response to one or more sensed conditions based on one or more parameters in the illumination zones within the transportation terminal.

19. The high-mast lighting system of claim 18, wherein the one or more parameters may be standardized and/or customized.

* * * * *